United States Patent
Suzuki

(10) Patent No.: US 7,327,381 B2
(45) Date of Patent: Feb. 5, 2008

(54) SIGNAL TRANSMISSION SYSTEM, SIGNAL TRANSMITTER, AND SIGNAL RECEIVER

(75) Inventor: Hidekazu Suzuki, Yamatokoriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1298 days.

(21) Appl. No.: 10/130,694

(22) PCT Filed: Sep. 25, 2001

(86) PCT No.: PCT/JP01/08315

§ 371 (c)(1), (2), (4) Date: Aug. 13, 2002

(87) PCT Pub. No.: WO02/25946

PCT Pub. Date: Mar. 28, 2002

(65) Prior Publication Data

US 2003/0032392 A1 Feb. 13, 2003

(30) Foreign Application Priority Data

Sep. 25, 2000 (JP) ............................. 2000-290374

(51) Int. Cl.
*H04N 7/14* (2006.01)
(52) U.S. Cl. .................. 348/14.13; 348/14.05
(58) Field of Classification Search ............ 348/14.13, 348/423.1, 474, 476, 483; 370/535
See application file for complete search history.

(56) References Cited

U.S. PATENT DOCUMENTS

| | | | |
|---|---|---|---|
| 4,851,909 A * | 7/1989 | Noske et al. ............... | 348/512 |
| 5,506,627 A | 4/1996 | Ciardi | |
| 5,701,581 A | 12/1997 | Eto et al. | |
| 5,726,682 A | 3/1998 | Lum et al. | |
| 5,940,070 A * | 8/1999 | Koo ........................... | 348/482 |
| 6,337,867 B1 | 1/2002 | Ejiri | |
| 2003/0032392 A1 | 2/2003 | Suzuki | |

FOREIGN PATENT DOCUMENTS

| | | |
|---|---|---|
| JP | 60-174958 | 11/1985 |
| JP | 4-302594 | 10/1992 |
| JP | 5-64171 | 3/1993 |

(Continued)

OTHER PUBLICATIONS

"Outline of the DPMS & DDC Standard", Interface, Oct. 1, 1995, p. 144-148.

(Continued)

*Primary Examiner*—Stella Woo
(74) *Attorney, Agent, or Firm*—Wenderoth, Lind & Ponack, L.L.P.

(57) ABSTRACT

A signal transmission system has a signal transmission apparatus including a time-base compression unit for time-base-compressing an audio signal, and a multiplexing unit for time-division-multiplexing a control signal and the time-base-compressed audio signal in a blanking period of a video signal. The signal transmission apparatus transmits the time-division-multiplexed signal through a transmission path. The signal transmission system also has a signal reception apparatus including a demultiplexing unit for demultiplexing the signal in which the video signal, the control signal, and the time-base-compressed audio signal are time-division-multiplexed. The multiplexed signal is transmitted from the signal transmission apparatus to the signal reception apparatus and demultiplexed into the video signal, the control signal, and the time-base-compressed audio signal, respectively, and a time-base decompression unit for decompressing the time-base-compressed audio signal.

22 Claims, 15 Drawing Sheets

FOREIGN PATENT DOCUMENTS

| | | |
|---|---|---|
| JP | 6-133239 | 5/1994 |
| JP | 6-343165 | 12/1994 |
| JP | 8-130671 | 5/1996 |
| JP | 9-179536 | 7/1997 |
| JP | 2000-175203 | 6/2000 |
| JP | 2000-188757 | 7/2000 |
| JP | 2000-228762 | 8/2000 |
| JP | 2001-251385 | 9/2001 |
| JP | 2002-171495 | 6/2002 |
| WO | 97/48056 | 12/1997 |
| WO | 98/15121 | 4/1998 |
| WO | 00/14626 | 3/2000 |
| WO | 02/09443 | 1/2002 |

OTHER PUBLICATIONS

"Detailed Description of the SCSI Standard", Separate-volume Interface—The latest SCSI Manual, Feb. 1, 1989, p. 144-147.

Junko Yoshida, "Silicon Image chips add audio support to DVI link", Jan. 2001, p. 1-4.

Keith Y. Reynolds et al., "Multiplexing and Demultiplexing Digital Audio and Video in Today's Digital Environment", SMPTE Journal, Oct. 1993, p. 905-909.

DDWG (Digital Display Working Group), "Digital Visual Interface DVI", (on line), Rev. 1.0, Apr. 2, 1999, (retrieved on Oct. 24, 2004), Retrieved from the Internet: <URL: http://www.ddwg.org/register/index.php3>.

Silicon Image "PanelLink A/V: The Digital Solution for HDTV (on line),", Feb. 2001, (retrieved on Oct. 24, 2001), Retrieved from the Internet: <URL: http://www.siimage.com/documents/Sil-WP-003-A.pdf>.

Hidekazu Suzuki et al., "Signal Transmitter and Signal Receiver", U.S. Appl. No. 10/088,586, filed Jul. 9, 2002, including 34 pgs., 17 sheets of drawings (Figs. 1-26) and Executed Declaration.

* cited by examiner

SIGNAL TRANSMISSION SYSTEM, SIGNAL TRANSMITTER, AND SIGNAL RECEIVER

CROSS-REFERENCE TO RELATED APPLICATIONS

This application is a national stage of international application No. PCT/JP01/08315, filed Sep. 25, 2001.

BACKGROUND OF THE INVENTION

1. Field of the Invention

The present invention relates to a signal transmission system, a signal transmission apparatus, and a signal reception apparatus, which are able to transmit or transmit and receive an audio signal and a control signal together with a video signal.

2. Description of the Related Art

A conventional signal transmission system based on the Digital Visual Interface (DVI) standard will be described with reference to FIG. 25. FIG. 25 is a block diagram illustrating the construction of the conventional signal transmission system.

In FIG. 25, the conventional signal transmission system comprises Transmission Minimized Differential Signaling (TMDS) encoders/serializers 2601~2603 which are provided on the transmitting end, and TMDS decoders/recovery units 2604-2606 which are provided on the receiving end.

In the conventional signal transmission system, video signals such as RED, GREEN, and BLUE are inputted to the TMDS encoders/serializers 2601~2603 at the transmitting end, and the TMDS encoders/serializers 2601~2603 perform TMDS encoding on the video signals, serialize the encoded video signals, and output the serialized video signals to a transmission path. At the receiving end, the TMDS decoders/recovery units 2604~2606 perform TMDS decoding on the received signals, and recover the decoded signals to restore the video signals.

A Data Enable (DE) signal is a signal indicating a period during which a video signal such as RED, GREEN, or BLUE exists, and this is a HIGH active signal. For example, a period during which the DE signal is LOW is a horizontal blanking period or vertical blanking period of the video signal. Four control (CTL) signals, CTL0, CTL1, CTL2, and CTL3, are prepared as control signals. However, in the existing DVI standard, these CTL signals are not used yet. To be specific, the levels of these control signals are "0" at all times.

In each of the TMDS encoders/serializers 2601~2603 at the transmitting end, a video signal inputted by 8 bits is converted into a 10-bit video signal, and serialized to be outputted to the transmission path. The purpose of the 8-bits/10-bits conversion is to convert the video signal into a form suited for high-speed transmission by reducing the change points of data. Further, in the TMDS encoders/serializers 2601~2603, a 2-bit control signal is converted into a 10-bit control signal to be outputted to the transmission path. Further, the DE signal is also encoded, serialized, and outputted to the transmission path. In each of the TMDS decoders/recovery units 2604~2606 at the receiving end, the 10-bit serial data received from the transmission path is decoded and recovered to the 8-bit chrominance signal, the DE signal, and the 2-bit control signal.

Since the DVI standard is a standard for transmitting only video signals (R, G, B signals), the conventional signal transmission system cannot transmit an audio signal and a control signal to be used for controlling a monitor or the like.

Furthermore, also in the case where a video signal is transmitted using a standard other than the DVI standard, a video signal and an audio signal or a control signal are transmitted through different transmission paths. Therefore, a transmission line for transmitting the audio signal or the control signal is required in addition to the transmission line for transmitting the video signal.

The present invention is made to solve the above-described problems and has for its object to provide a signal transmission system, a signal transmission apparatus, and a signal reception apparatus which are able to transmit an audio signal and a control signal together with a video signal through the same transmission path.

BRIEF SUMMARY OF THE INVENTION

A signal transmission system according to the present invention has a signal transmission apparatus for transmitting a signal, and a signal reception apparatus for receiving the signal transmitted from the signal transmission apparatus through a transmission path. The signal transmission apparatus time-base-compresses an audio signal, time-division-multiplexes a video signal, a control signal which is used for controlling the signal reception apparatus or a device connected to the signal reception apparatus, and the time-base-compressed audio signal, and transmits the multiplexed signal to the signal reception apparatus through the transmission path. The signal reception apparatus demultiplexes the signal transmitted from the signal transmission apparatus into the video signal, the control signal, and the time-base-compressed audio signal, and decompresses the time-base-compressed audio signal.

According to the present invention, the video signal, the control signal, and the audio signal can be time-division-multiplexed and transmitted through the same transmission line, whereby the number of lines in the transmission path can be reduced or the transmission path can be narrowed.

Furthermore, according to the present invention, in the above-described signal transmission system the signal transmission apparatus multiplexes the control signal and the time-base-compressed audio signal in a blanking period of the video signal.

According to the invention, the video signal, the control signal, and the audio signal can be time-division-multiplexed so that the video signal does not overlap the control signal and the audio signal in the same period.

Furthermore, according to the present invention, in the above-described signal transmission system, the signal transmission apparatus multiplexes the control signal in a predetermined portion of the blanking period, and multiplexes the time-base-compressed audio signal in the blanking period except the predetermined portion.

According to the invention, the control signal and the audio signal can be time-division-multiplexed so that the control signal and the audio signal do not overlap one another in same portion of a period where the video signal is absent.

Furthermore, according to the present invention, in the above-described signal transmission system, the signal transmission apparatus transmits a vertical sync signal and a horizontal sync signal to the signal reception apparatus. The signal reception apparatus receives the vertical sync signal and the horizontal sync signal, and performs demultiplexing of the video signal, the control signal, and the time-base-compressed audio signal, using the vertical sync signal and the horizontal sync signal.

According to the invention, at the receiving end, the blanking period can be detected using the vertical sync signal and the horizontal sync signal, and the control signal and the audio signal which are multiplexed in the blanking period can be demultiplexed.

Furthermore, according to the present invention, in the above-described signal transmission system the signal transmission apparatus provides a predetermined no-signal period before each of the control signal and the time-base-compressed audio signal. The signal reception apparatus specifies the periods in which the control signal and the time-base-compressed audio signal are multiplexed by detecting the no-signal periods, and demultiplexes the control signal and the time-base-compressed audio signal.

According to the invention, demultiplexing of the audio signal and the control signal can be carried out at the receiving end, without transmitting the vertical sync signal and the horizontal sync signal from the signal transmission apparatus to the signal reception apparatus.

Furthermore, according to the present invention, in the above-described signal transmission system, the signal transmission system employs the DVI transmission standard for serially transmitting video signals of R, G, B. The signal transmission apparatus multiplexes the control signal and the time-base-compressed audio signal in a predetermined channel selected from among channels for R, G, B. The signal reception apparatus demultiplexes the control signal and the time-base-compressed audio signal which are multiplexed in the predetermined channel.

According to the invention, in the conventional system based on the DVI standard which can transmit only a video signal, transmission of a control signal and an audio signal using a transmission line for the video signal is realized.

Furthermore, according to the present invention, in the above-described signal transmission system the signal transmission apparatus decomposes the time-base-compressed audio signal into plural audio signals, and multiplexes the decomposed audio signals into plural channels. The signal reception apparatus demultiplexes the decomposed audio signals and composes the decomposed audio signals.

According to the invention, even when the transmission rate of the audio signal is high, the audio signal can be transmitted without thinning out sampling points of the audio signal.

Furthermore, a signal transmission apparatus according to the present invention is a signal transmission apparatus connected to a signal reception apparatus through a transmission path. The signal transmission apparatus includes a time-base compression means for time-base-compressing an audio signal and a signal multiplexing means for time-division-multiplexing a video signal. Moreover, the signal transmission apparatus includes a control signal which is used for control at the signal receiving end, and the audio signal which is time-base-compressed by the time-base compression means, and transmitting the multiplexed signal to the signal reception apparatus through the transmission path.

According to the invention, the video signal, the control signal, and the audio signal can be time-division-multiplexed and transmitted through the same transmission path, whereby the number of lines in the transmission path can be reduced, or the transmission path can be narrowed.

Furthermore, according to the present invention, in the above-described signal transmission apparatus, the signal multiplexing means multiplexes the control signal and the time-base-compressed audio signal in a blanking period of the video signal.

According to the present invention, the video signal, the control signal, and the audio signal can be time-division-multiplexed so that the video signal does not overlap the control signal and the audio signal in the same period.

Furthermore, according to the present invention, in the above-described signal transmission apparatus, the signal multiplexing means multiplexes the control signal in a predetermined portion of the blanking period, and multiplexes the time-base-compressed audio signal in the blanking period except the predetermined portion.

According to the invention, the control signal and the audio signal can be time-division-multiplexed so that the control signal and the audio signal do not overlap one another in the same portion of a period where the video signal is absent.

Furthermore, according to the present invention, in the above-described signal transmission apparatus, the signal multiplexing means transmits a vertical sync signal and a horizontal sync signal which are used for detection of the blanking period, to the signal reception apparatus.

According to the invention, at the receiving end, the blanking period can be detected using the vertical sync signal and the horizontal sync signal, and the control signal and the audio signal which are multiplexed in the blanking period can be demultiplexed.

Furthermore, according to the present invention, in the above-described signal transmission apparatus, the signal multiplexing means provides a predetermined no-signal period before each of the control signal and the time-base-compressed audio signal.

According to the invention, demultiplexing of the audio signal and the control signal can be carried out at the receiving end, without transmitting the vertical sync signal and the horizontal sync signal from the signal transmission apparatus to the signal reception apparatus.

Furthermore, according to the present invention, in the above-described signal transmission apparatus, the signal multiplexing means employs the DVI transmission standard for serially transmitting video signals of R, G, B, and multiplexes the control signal and the time-base-compressed audio signal into a predetermined channel selected from among channels for R, G, B.

According to the invention, in the conventional system based on the DVI standard which can transmit only a video signal, transmission of a control signal and an audio signal using a transmission line for the video signal is realized.

Furthermore, according to the present invention, in the above-described signal transmission apparatus, the signal multiplexing means decomposes the time-base-compressed audio signal into many audio signals, and multiplexes the decomposed audio signals into plural channels.

According to the invention, even when the transmission rate of the audio signal is high, the audio signal can be transmitted without thinning out sampling points of the audio signal.

Furthermore, a signal reception apparatus according to the present invention is connected to a signal transmission apparatus through a transmission path. The signal reception apparatus includes a signal demultiplexing means for demultiplexing a signal in which a video signal, a control signal to be used for controlling the signal reception apparatus or a device connected to the signal reception apparatus, and a time-base-compressed audio signal are time-division-multiplexed. The signal is transmitted from the signal transmission apparatus through the transmission path, into the video signal, the control signal, and the time-base-compressed audio signal, respectively. The signal reception apparatus also includes time-base decompression means for decompressing the time-base-compressed audio signal.

According to the invention, the time-division-multiplexed video signal, control signal, and audio signal, which are transmitted from the transmitting end through the same transmission path, can be demultiplexed into the respective signals.

Furthermore, according to the present invention, in the above-described signal reception apparatus, the signal demultiplexing means demultiplexes the control signal and the time-base-compressed audio signal which are multiplexed in a blanking period of the video signal.

According to the invention, a signal in which a video signal, a control signal, and an audio signal are time-division-multiplexed so that the video signal does not overlap the control signal and the audio signal in the same period, can be demultiplexed into the respective signals.

Furthermore, according to the present invention, in the above-described signal reception apparatus, the signal demultiplexing means demultiplexes the control signal which is multiplexed in a predetermined portion of the blanking period. The signal demultiplexing means also demultiplexes the time-base-compressed audio signal which is multiplexed in the blanking period except the predetermined portion.

According to the invention, a signal in which a video signal, a control signal, and an audio signal are time-division-multiplexed so that the control signal and the audio signal do not overlap one another in the same portion of a period where the video signal is absent, can be demultiplexed into the respective signals.

Furthermore, according to the present invention, in the above-described signal reception apparatus, the signal demultiplexing means receives a vertical sync signal and a horizontal sync signal from the signal transmission apparatus, and performs demultiplexing of the video signal, the control signal, and the time-base-compressed audio signal, using the vertical sync signal and the horizontal sync signal.

According to the invention, the control signal and the audio signal which are multiplexed in the blanking period can be demultiplexed.

Furthermore, according to the present invention, in the above-described signal reception apparatus, the signal demultiplexing means detects a predetermined no-signal period which is provided before each of the control signal and the time-base-compressed audio signal. The signal demultiplexing means detects the predetermined no-signal period to specify periods in which the control signal and the time-base-compressed audio signal are multiplexed, and demultiplexes the control signal and the time-base-compressed audio signal.

According to the invention, demultiplexing of the control signal and the audio signal can be carried out at the receiving end without transmitting the vertical sync signal and the horizontal sync signal from the signal transmission apparatus to the signal reception apparatus.

Furthermore, according to the present invention, in the above-described signal reception apparatus, the signal demultiplexing means employs the DVI transmission standard for serially transmitting video signals of R, G, B. Moreover, the signal reception apparatus demultiplexes the control signal and the time-base-compressed audio signal which are multiplexed into a predetermined channel selected from among channels for R, G, B.

According to the invention, in the conventional system based on the DVI standard which can transmit only a video signal, transmission of a control signal and an audio signal using a transmission line for the video signal is realized.

Furthermore, according to the present invention, in the above-described signal reception apparatus, the time-base-compressed audio signal is decomposed into many audio signals, and the decomposed audio signals are multiplexed into plural channels. The signal demultiplexing means demultiplexes the decomposed audio signals and composes the decomposed audio signals.

Therefore, even when the transmission rate of the audio signal is high, the audio signal can be transmitted without thinning out sampling points of the audio signal, and at the receiving end, the decomposed audio signals can be composed to restore the original audio signal.

DETAILED DESCRIPTION OF THE INVENTION

Embodiment 1

Hereinafter, a signal transmission system, a signal transmission apparatus, and a signal reception apparatus according to a first embodiment of the present invention will be described with reference to the drawings.

Figure 1:
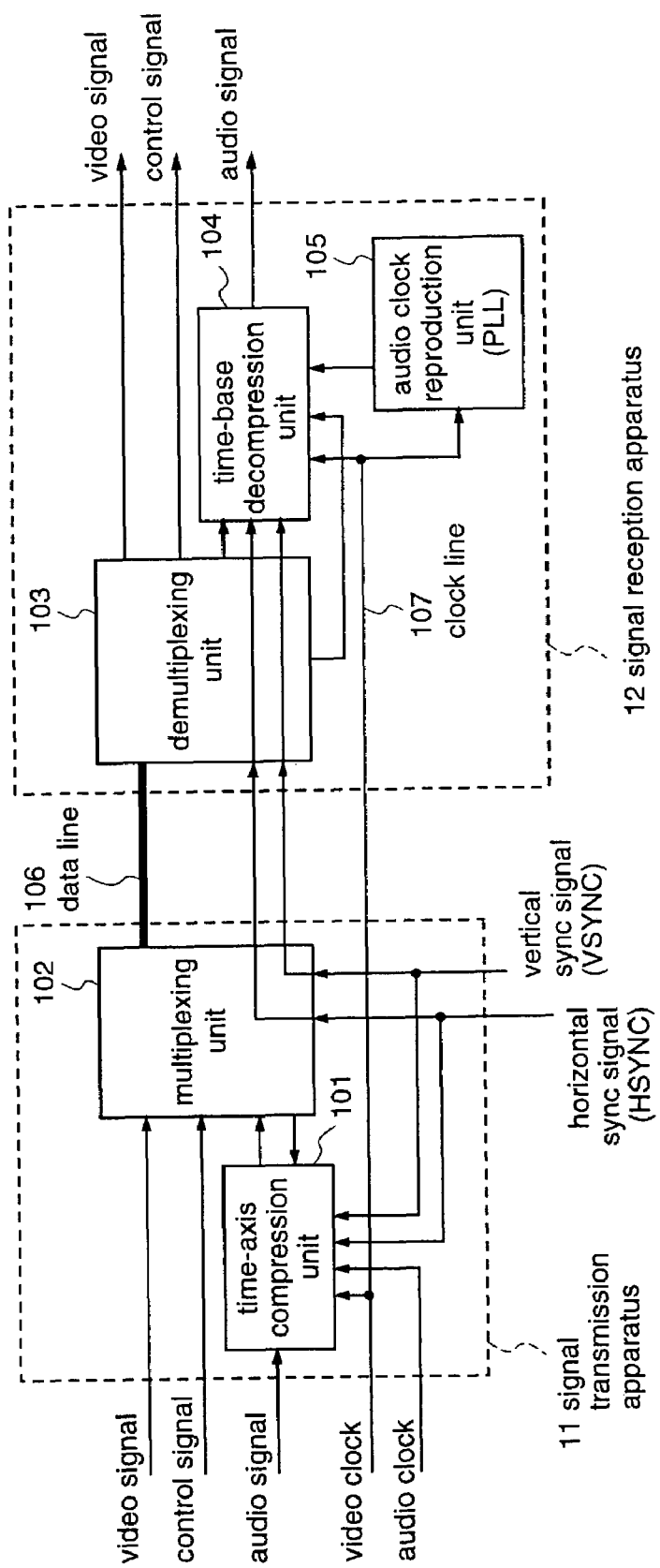
FIG. 1 is a block diagram illustrating a signal transmission system according to a first embodiment of the present invention.

FIG. 1 is a block diagram illustrating a signal transmission system according to the first embodiment.

With reference to FIG. 1, the signal transmission system according to the first embodiment comprises a signal transmission apparatus 11 and a signal reception apparatus 12. The signal transmission apparatus 11 comprises a time-base compression unit 101 for compressing an audio signal on the time axis. Moreover, the signal transmission apparatus 11 includes a multiplexing unit 102 for time-division-multiplexing a video signal, a control signal, and the time-base-compressed audio signal, and outputting the multiplexed signal to a data line 106. Data line 106 is a serial transmission path connecting the signal transmission apparatus 11 and the signal reception apparatus 12. The control signal is a signal for controlling the signal reception apparatus 12 or a device connected to the signal reception apparatus 12, such as a monitor. For example, the control signal controls the brightness or volume of a monitor. The signal reception apparatus 12 comprises a demultiplexing unit 103 for demultiplexing a multiplexed video-audio-control signal in which a video signal, an audio signal, and a control signal are multiplexed, which is transmitted through the data line 106, into the respective signals. The signal reception apparatus 12 also includes a time-base decompression unit 104 for performing time-base decompression on the audio signal separated by the demultiplexing unit 103 to restore the original audio signal, and an audio clock reproduction unit 105 for reproducing an audio clock on the basis of a video clock that is outputted from the signal transmission apparatus 11 through a clock line 107.

Figure 6:
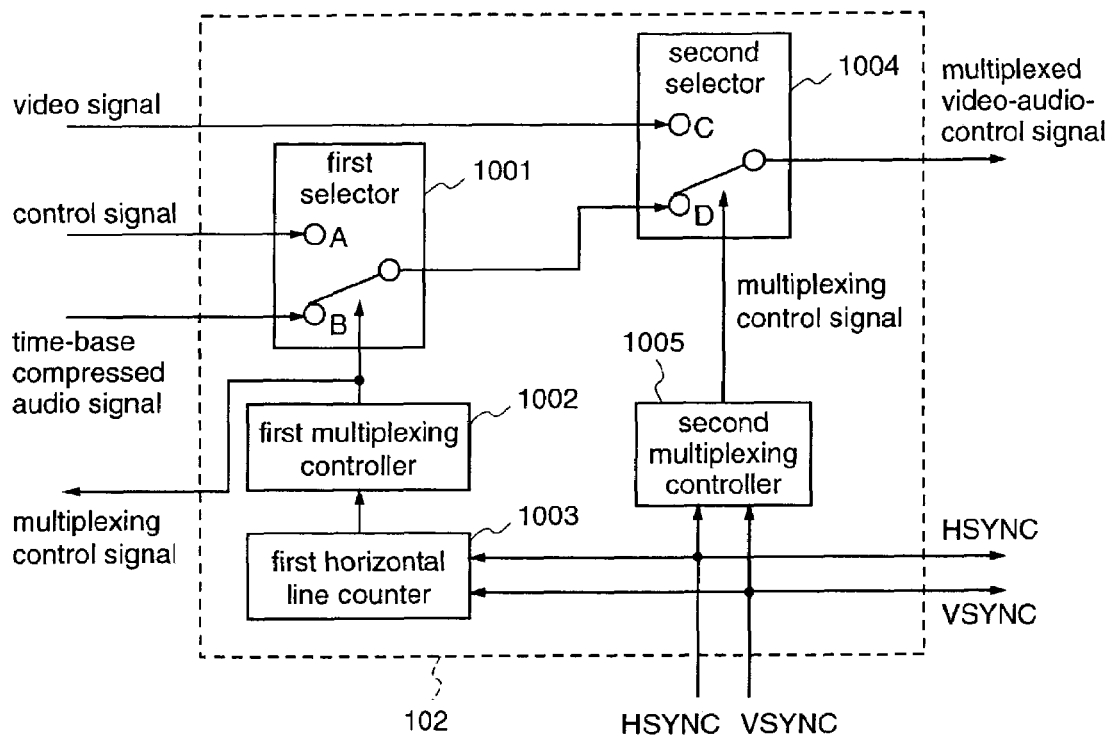
FIG. 6 is a block diagram illustrating a multiplexing unit according to the first embodiment.

FIG. 6 is a block diagram illustrating the multiplexing unit 102.

With reference to FIG. 6, the multiplexing unit 102 comprises a first selector 1001 for selecting either the control signal or the time-base-compressed audio signal, a first multiplexing controller 1002 for controlling the first selector 1001, and a first horizontal line counter 1003 for counting the number of horizontal lines on a screen. Moreover, the multiplexing unit 102 includes a second selector 1004 for selecting either the video signal or the output from the first selector 1001, and a second multiplexing controller 1005 for controlling the second selector 1004.

Figure 8:
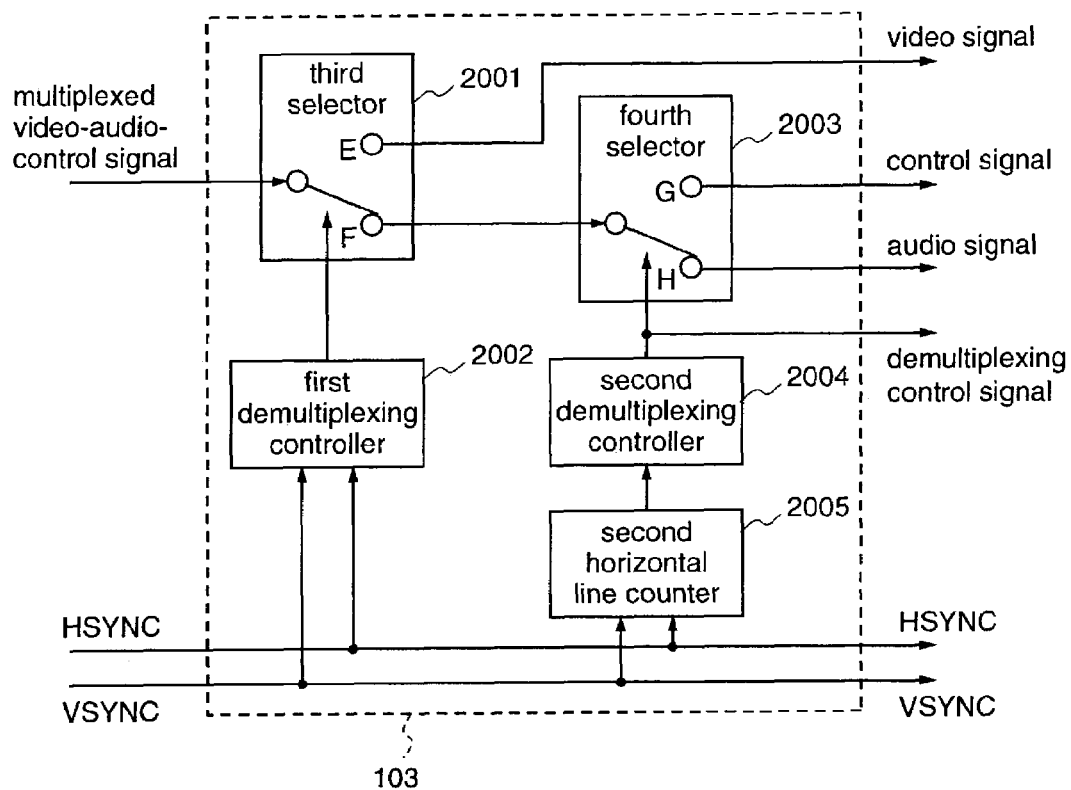
FIG. 8 is a block diagram illustrating a demultiplexing unit according to the first embodiment.

FIG. 8 is a block diagram illustrating the demultiplexing unit 103.

With reference to FIG. 8, the demultiplexing unit 103 comprises a third selector 2001 for dividing the multiplexed video-audio-control signal into the video signal and the other signals, a first demultiplexing controller 2002 for controlling the third selector 2001, and a fourth selector 2003 for dividing the signal in which the audio signal and the control signal are multiplexed, into the audio signal and the control signal. Moreover, the demultiplexing unit 103 includes a second demultiplexing controller 2004 for controlling the fourth selector 2003 and a second horizontal line counter 2005 for counting the number of horizontal lines on the screen.

Next, a description will be given of the operations of the signal transmission system, the signal transmission apparatus, and the signal reception apparatus according to the first embodiment.

Initially, the operation of the signal transmission apparatus 11 will be described.

Figure 2:
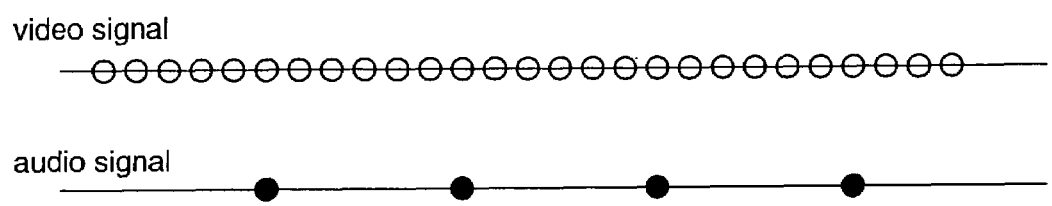
FIG. 2 is a schematic diagram illustrating the relationship between a video signal and an audio signal before time-base compression.

FIG. 2 is a schematic diagram illustrating the relationship between the video signal and the audio signal before being subjected to time-base compression.

As schematically shown in FIG. 2, generally, the amount of data per unit time is larger in the video signal than in the audio signal. Therefore, one sample of the audio signal approximately corresponds to several samples of the video signal. In the signal transmission system according to the first embodiment, this audio signal is temporally compressed, and the control signal and the compressed audio signal are multiplexed in a domain where no video signal exists.

Figure 3:
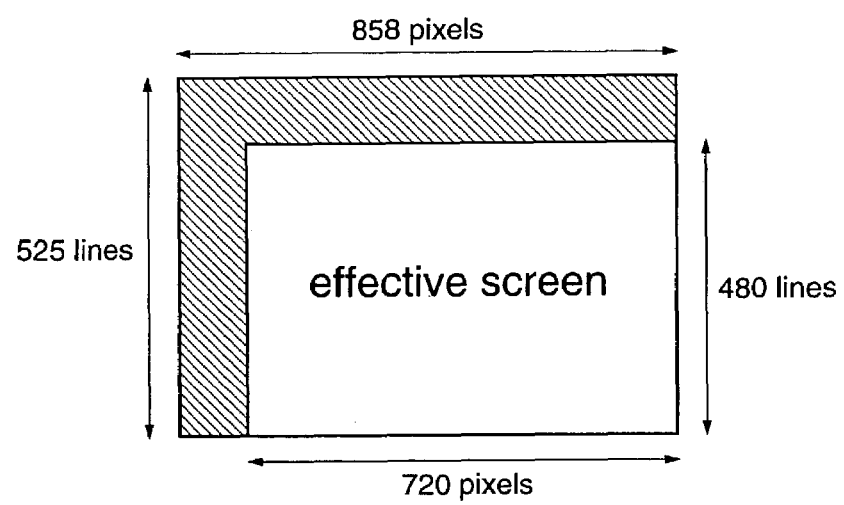
FIG. 3 is a diagram illustrating a horizontal blanking period, a vertical blanking period, and an effective screen.

As a time domain where no video signal exists, there is a horizontal blanking period or vertical blanking period of the video signal as shown in FIG. 3. In FIG. 3, a diagonally shaded portion outside an effective screen corresponds to a blanking period (horizontal blanking period+vertical blanking period). In FIG. 3, a SD screen of MP@ML (Main Profile Main Level) of MPEG2 is employed as an example. The full screen comprises 858 pixels in the horizontal direction×525 lines in the vertical direction. The effective screen comprises 720 pixels in the horizontal direction×480 lines in the vertical direction. A difference between the full screen and the effective screen corresponds to the blanking period. The audio signal and the control signal are multiplexed in this blanking period.

Figure 4:
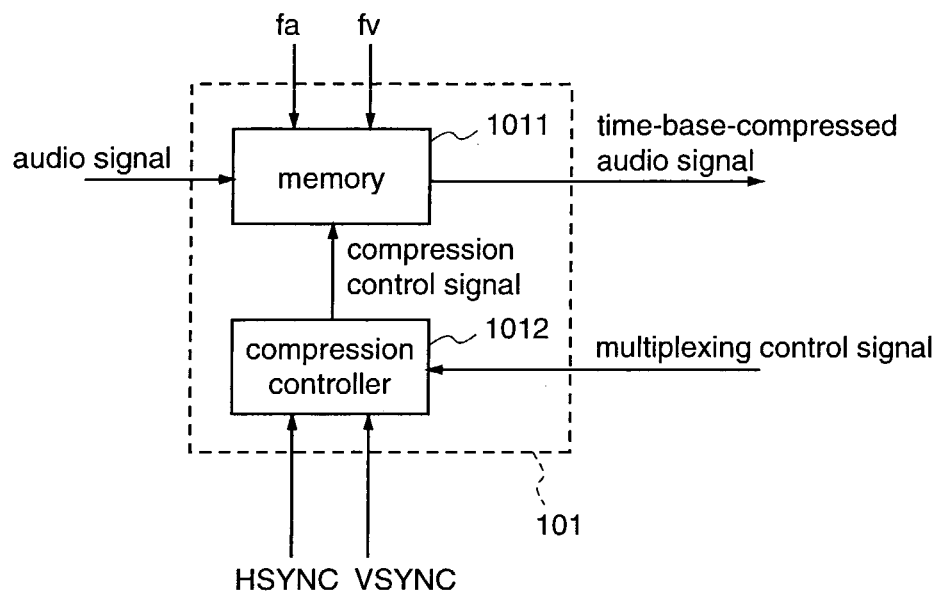
FIG. 4 is a block diagram illustrating a time-base compression unit according to the first embodiment.

FIG. 4 is a block diagram illustrating the time-base compression unit 101.

The time-base compression unit 101 shown in FIG. 4 is provided with a memory 1011 and a compression controller 1012, and converts the rate of the inputted audio signal. To be specific, an input clock of the audio signal to the memory 1011 is an audio clock (frequency: fa), and an output clock from the memory 1011 is a video clock (frequency: fv). Here, "fa" is an audio sampling clock frequency, and "fv" is a video sampling clock frequency. A compression control signal outputted from the compression controller 1012 is used for controlling the output of the memory 1011. This compression control signal is the AND of a horizontal sync signal and a vertical sync signal obtained by the compression controller 1012, and it is outputted when a multiplexing control signal supplied from the multiplexing unit 102 is "1" (i.e., when the first selector 1001 selects the audio signal side (B)). The memory 1011 outputs the time-base-compressed audio signal in a period during which the compression control signal is LOW. In this way, the time-base-compressed audio signal is obtained. However, the horizontal sync signal (HSYNC) and the vertical sync signal (VSNC) are negative logic (Active Low).

Figure 5:
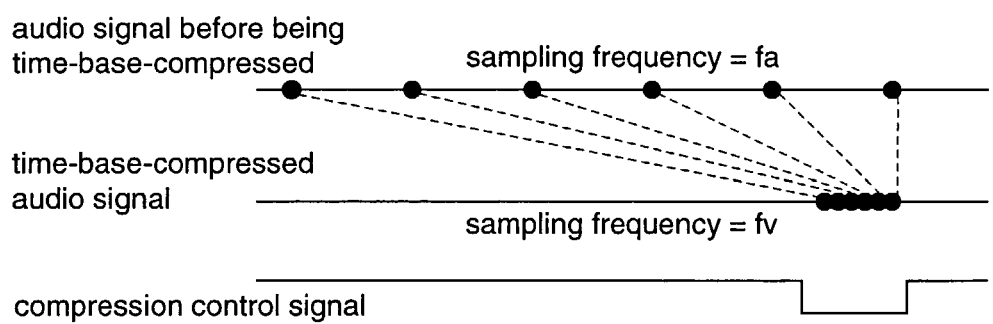
FIG. 5 is a diagram illustrating time-base compression according to the first embodiment.

FIG. 5 is a diagram illustrating time-base compression.

In FIG. 5, the audio signal before being time-base-compressed is inputted to the memory 1011 at the sampling frequency fa, and the time-base-compressed audio signal is outputted from the memory 1011 at the sampling frequency fv. The time-base-compressed audio signal is outputted in a period during which the compression control signal from the compression controller 1012 is LOW. Although, in FIG. 5 only several sampling points of the audio signal, which are outputted within the period during which the compression control signal is LOW, are shown for convenience of explanation, the number of sampling points to be outputted actually is far larger than that shown in FIG. 5.

Next, a description will be specifically given of the operation of the multiplexing unit 102 which multiplexes the video signal, the control signal, and the time-base-compressed audio signal to output a multiplexed video-audio-control signal, with reference to FIG. 6.

As described above, the control signal and the time-base-compressed audio signal are multiplexed in a period where no video signal exists. As shown in FIG. 3, since the 1st to 45th lines on the screen correspond to the vertical blanking period, a monitor control signal is superimposed on the 1st line while an audio signal is superimposed on the 2nd to 45th lines, in this first embodiment. Further, the audio signal is also superimposed on the horizontal blanking period corresponding to the 46th and subsequent lines.

The first horizontal line counter 1003 performs count-up at every falling edge of the horizontal sync signal (HSYNC) with a falling edge of the vertical sync signal (VSYNC) being a starting point, thereby counting the number of horizontal lines. The initial value of the first horizontal line counter 1003 is "1". The first multiplexing controller 1002 outputs "0" as a multiplexing control signal when the output of the first horizontal line counter 1003 is "1", and outputs "1" as a multiplexing control signal when the output of the first horizontal line counter 1003 is equal to or larger than 2. The first selector 1001 selects the control signal side (A) when the multiplexing control signal received from the first multiplexing controller 1002 is "0", and selects the audio signal side (B) when the multiplexing control signal is "1". In this way, the control signal side (A) is selected in the 1st line of the screen, and the audio signal side (B) is selected in the 2nd and subsequent lines. The control signal is inputted to the first selector 1001 only when the first selector 1001 selects the control signal side (A). Further, the multiplexing control signal supplied from the first multiplexing controller 1002 is outputted to the time-base compression unit 101 as well.

The second multiplexing controller 1005 controls the second selector 1004 so that the second selector 1004 selects the selected output side (D) of the first selector 1001 in the vertical blanking period (a period during which the VSYNC is LOW) or the horizontal blanking period (a period during which the HSYNC is LOW), and selects the video signal side (C) in a period that is neither the vertical blanking period nor the horizontal blanking period, i.e., an effective screen period. In this way, the multiplexed video-audio-control signal, in which the video signal, the control signal, and the time-base-compressed audio signal are multiplexed, is obtained.

Figure 7:
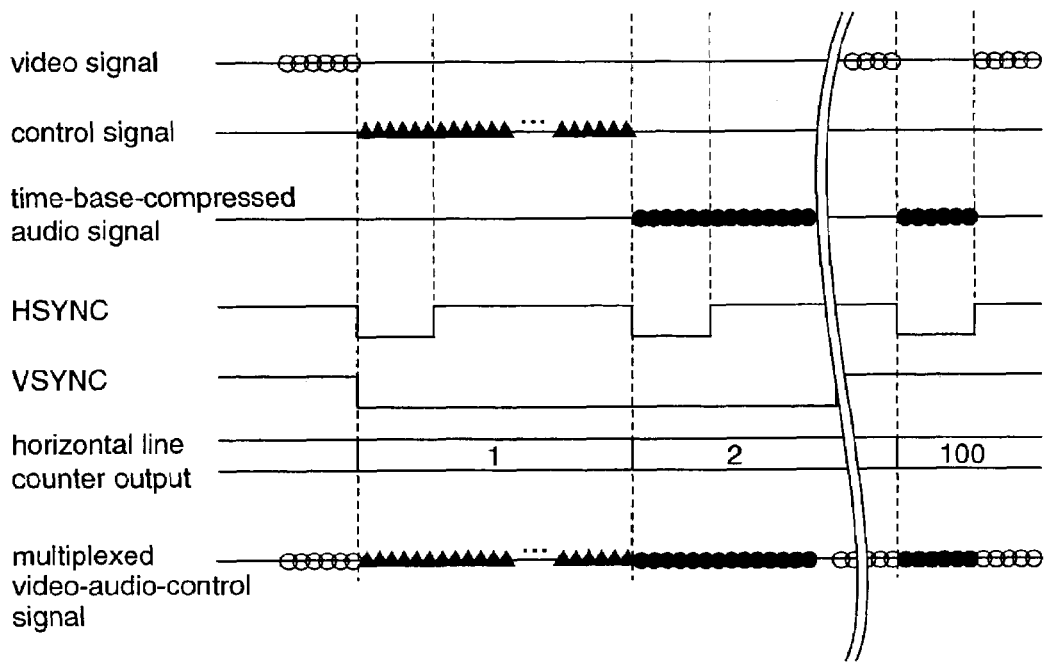
FIG. 7 is a diagram illustrating multiplexing of a video signal, an audio signal, and a control signal, according to the first embodiment.

FIG. 7 is a diagram illustrating multiplexing of the video signal, the audio signal, and the control signal, according to the first embodiment. The signals shown in FIG. 7 are, from top to bottom, the video signal inputted to the signal transmission apparatus 11, the control signal inputted to the signal transmission apparatus 11, the time-base-compressed audio signal outputted from the time-base compression unit 101, the horizontal sync signal (HSYNC), the vertical sync signal (VSYNC), the output from the first horizontal line counter 1003, and the multiplexed video-audio-control signal outputted from the multiplexing unit 102. The multiplexed video-audio-control signal is transmitted from the signal transmission apparatus 11 through the data line 106 to the signal reception apparatus 12. In FIG. 7, white circles show sampling points of the video signal, triangles show sampling points of the control signal, and black circles show sampling points of the audio signal. In FIG. 7, the control signal is superimposed on the 1st line in the vertical blanking period (i.e., when the horizontal line counter output is "1"), and the audio signal is superimposed on the 2nd and subsequent lines in the vertical blanking period (i.e., when the horizontal line counter output is 2~45), and when the vertical blanking period is ended, the audio signal is superimposed on the horizontal blanking period. The video signal exists in the effective screen period after the vertical blanking period is ended.

Next, the operation of the signal reception apparatus 12 will be described.

Initially with reference to FIG. 8, a description will be specifically given of the operation of the demultiplexing unit 103. Demultiplexing unit 103 demultiplexes the multiplexed video-audio-control signal in which the video signal, the control signal, and the time-base-compressed audio signal are multiplexed, into the respective signals and outputs the respective signals.

As described above, the control signal and the time-base-compressed audio signal are multiplexed in a period where no video signal exists. Accordingly, the multiplexed video-audio-control signal which is transmitted from the signal transmission apparatus 11 is demultiplexed into the video signal and the signal other than the video signal by the third selector 2001 and, thereafter, the signal other than the video signal is demultiplexed into the control signal and the time-base-compressed audio signal by the fourth selector 2003.

The control signal is superimposed on the 1st line of the screen, which line is in the vertical blanking period, and the audio signal is superimposed on the subsequent vertical blanking period and the horizontal blanking period. Therefore, the first demultiplexing controller 2002 controls the third selector 2001 so that it selects the video signal output side (E) in the period other than the vertical blanking period and the horizontal blanking period (i.e., blanking period), and selects the fourth selector 2003 side (F) in the blanking period.

The second horizontal line counter 2005 counts the number of horizontal lines, in a like manner as the first horizontal line counter 1003. The second demultiplexing controller 2004 outputs "0" as a demultiplexing control signal when the output of the second horizontal line counter 2005 is 1, and outputs "1" as a demultiplexing control signal when the output of the second horizontal line counter 2005 is equal to or larger than 2. The fourth selector 2003 selects the control signal output side (G) when the demultiplexing control signal received from the second demultiplexing controller 2004 is "0", and selects the audio signal output side (H) when the demultiplexing control signal is "1". In this way, the control signal output side (G) is selected in the 1st line of the screen, and the audio signal output side (H) is selected in the 2nd and subsequent lines. The demultiplexing control signal supplied from the second demultiplexing controller 2004 is also outputted to the time-base decompression unit 104.

Figure 9:
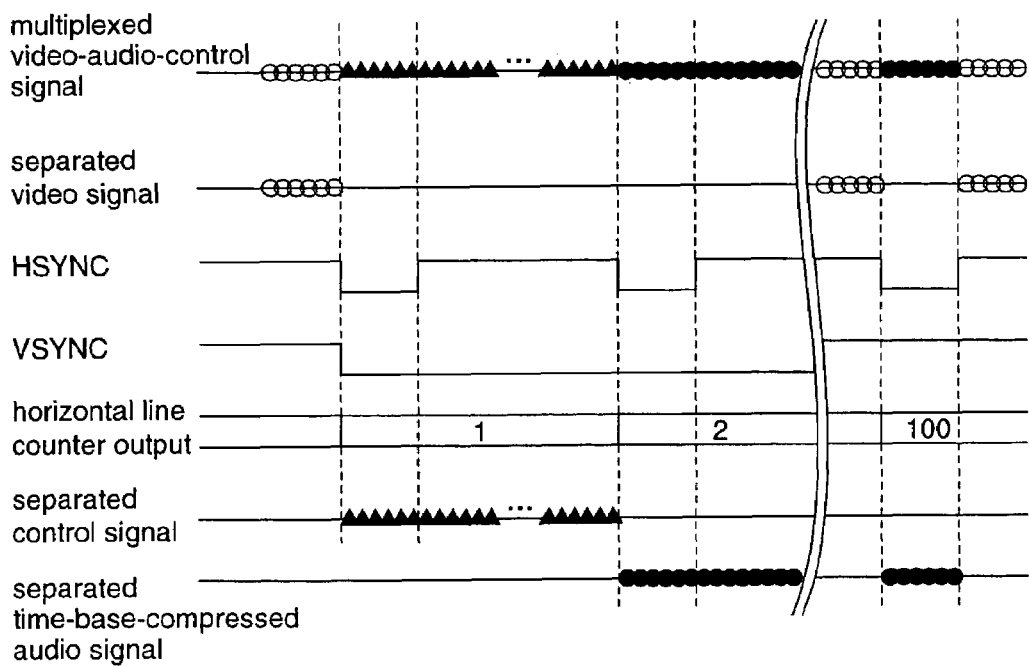
FIG. 9 is a diagram illustrating demultiplexing of a video signal, an audio signal, and a control signal, according to the first embodiment.

FIG. 9 is a diagram illustrating demultiplexing of the multiplexed signal into the video signal, the audio signal, and the control signal. The signals shown in FIG. 9 are, from top to bottom, the multiplexed video-audio-control signal inputted to the signal reception apparatus 12, the video signal separated by the demultiplexing unit 103, the horizontal sync signal (HSYNC), the vertical sync signal (VSYNC), the output from the second horizontal line counter 2005, the control signal separated by the demultiplexing unit 103, and the time-base-compressed audio signal separated by the demultiplexing unit 103. In FIG. 9, white circles are sampling points of the video signal, triangles are sampling points of the control signal, and black circles are sampling points of the audio signal, as in FIG. 7. The control signal is separated in the 1st line of the vertical blanking period (i.e., when the horizontal line counter output is "1"), and the audio signal is separated in the 2nd and subsequent lines of the vertical blanking period (i.e., when the horizontal line counter output is 2~45). When the vertical blanking period is ended, the video signal is separated in the effective screen period, and the audio signal is separated in the horizontal blanking period.

Next, the time-base decompression unit 104 will be described.

Figure 10:
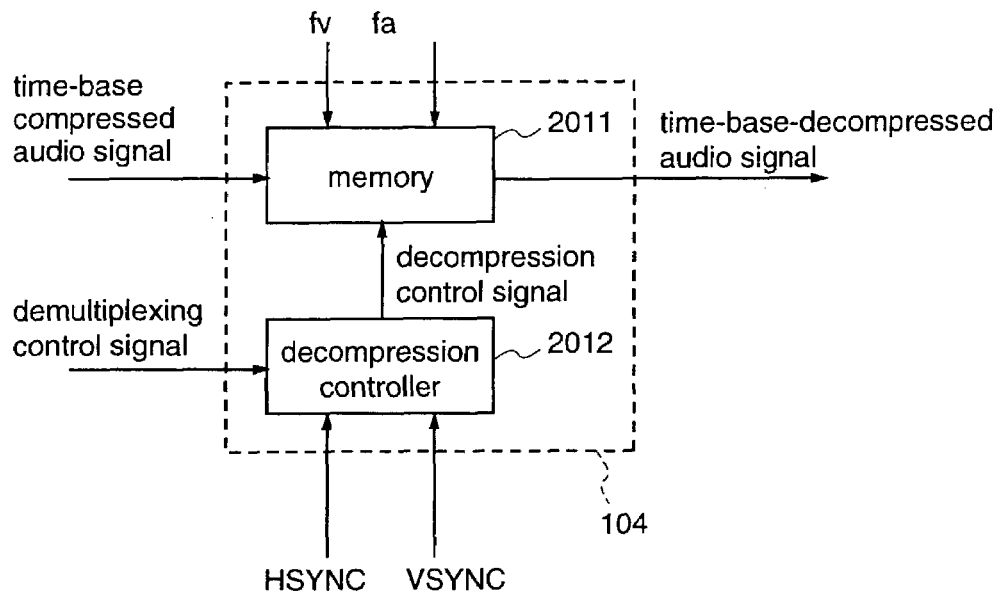
FIG. 10 is a block diagram illustrating a time-base decompression unit according to the first embodiment.

FIG. 10 is a block diagram illustrating the construction of the time-base decompression unit 104.

The time-base decompression unit 104 shown in FIG. 10 is provided with a memory 2011 and a decompression controller 2012, and converts the rate of the time-base-compressed audio signal. To be specific, an input clock of the time-base-compressed audio signal to the memory 2011 is a sampling clock of video (frequency: fv), and an output clock from the memory 2011 is a sampling clock of audio (frequency: fa). A decompression control signal outputted from the decompression controller 2012 is used for controlling the input to the memory 2011. This decompression control signal is the AND of the horizontal sync signal and the vertical sync signal obtained by the decompression controller 2012, and it is outputted when the demultiplexing control signal from the demultiplexing unit 103 is "1" (i.e., when the fourth selector 2003 selects the audio signal output side (H)). The memory 2011 receives the time-base-compressed audio signal in a period during which the decompression control signal is LOW. In this way, the time-base-decompressed audio signal, i.e., the restored audio signal, is obtained. However, both of the horizontal sync signal and the vertical sync signal are negative logic.

Figure 11:
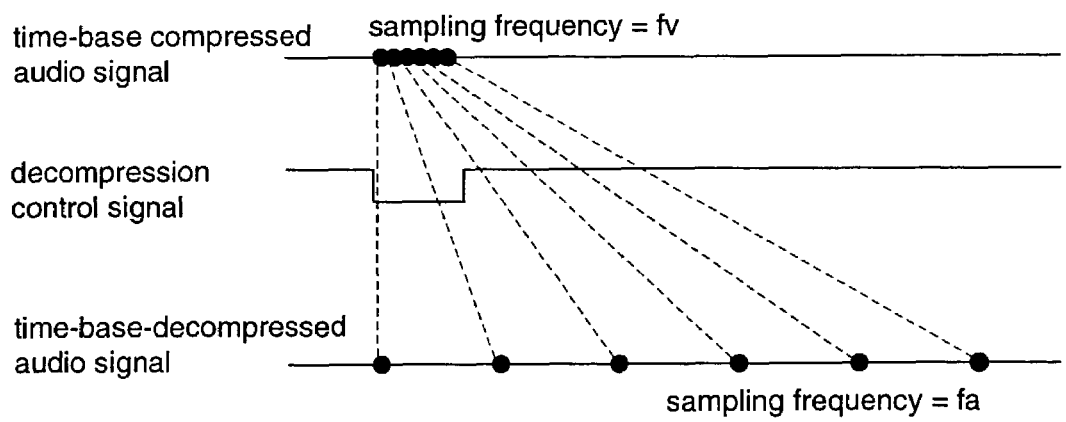
FIG. 11 is a diagram illustrating time-base decompression according to the first embodiment.

FIG. 11 is a diagram for explaining time-base decompression.

In FIG. 11, the time-base-compressed audio signal is inputted to the memory 2011 at the sampling frequency fv, and the time-base-decompressed audio signal is outputted from the memory 2011 at the sampling frequency fa. The time-base-compressed audio signal is inputted to the memory 2011 in a period during which the decompression control signal is LOW.

Finally, the operation of the audio clock reproduction unit 105 will be described.

In the signal reception apparatus 12, the video clock supplied from the signal transmission apparatus 11 is inputted to a PLL (Phase Locked Loop) in the audio clock reproduction unit 105, whereby the video clock is frequency-divided to reproduce the audio clock, and the audio clock is supplied to the time-base decompression unit 104.

As described above, in the signal transmission system, the signal transmission apparatus, and the signal reception apparatus according to the first embodiment, the time-base compression unit 101 performs time-base compression on the audio signal, the multiplexing unit 102 superimposes the control signal on the 1st line of the vertical blanking period, and superimposes the time-base-compressed audio signal on the 2nd and subsequent lines of the vertical blanking period and on the horizontal blanking period. Thus, the video signal, the control signal, and the audio signal can be time-division-multiplexed to be transmitted through the same data line. As a result, the number of lines in the transmission path for transmitting video signals, audio signals and the like can be reduced, or the transmission path can be narrowed. Further, the demultiplexing unit 103 can specify the blanking period by using the horizontal sync signal and the vertical sync signal, and separate the multiplexed signal into the video signal, the control signal, and the audio signal.

Embodiment 2

Hereinafter, a signal transmission system, a signal transmission apparatus, and a signal reception apparatus according to a second embodiment of the present invention will be described with reference to the drawings.

The signal transmission system according to this second embodiment is identical to the signal transmission system according to the first embodiment in that a control signal and a compressed audio signal are multiplexed and transmitted during a video signal blanking period. However, but the features of the signal transmission system of this second embodiment are as follows. A no-signal period (L2 cycles of video clock) is provided before the control signal is superimposed on the vertical blanking period, thereby making the number of sampling points of the control signal constant (M2 samples) and, further, a no-signal period (L1 cycles of video clock) is provided before the audio signal is superimposed on the vertical blanking period or the horizontal blanking period, thereby making the number of sampling points of the audio signal constant (M1 samples). In this case, even when the horizontal sync signal and the vertical sync signal, which are to be used for demultiplexing the multiplexed video-audio-control signal, are not transmitted from the signal transmission apparatus to the signal reception apparatus, the signal reception apparatus can specify the period wherein the control signal and the audio signal are multiplexed, by detecting the no-signal periods, whereby the multiplexed signal can be demultiplexed into the video signal, the audio signal, and the control signal. The L1, M1, L2, and M2 are natural numbers.

Figure 12:
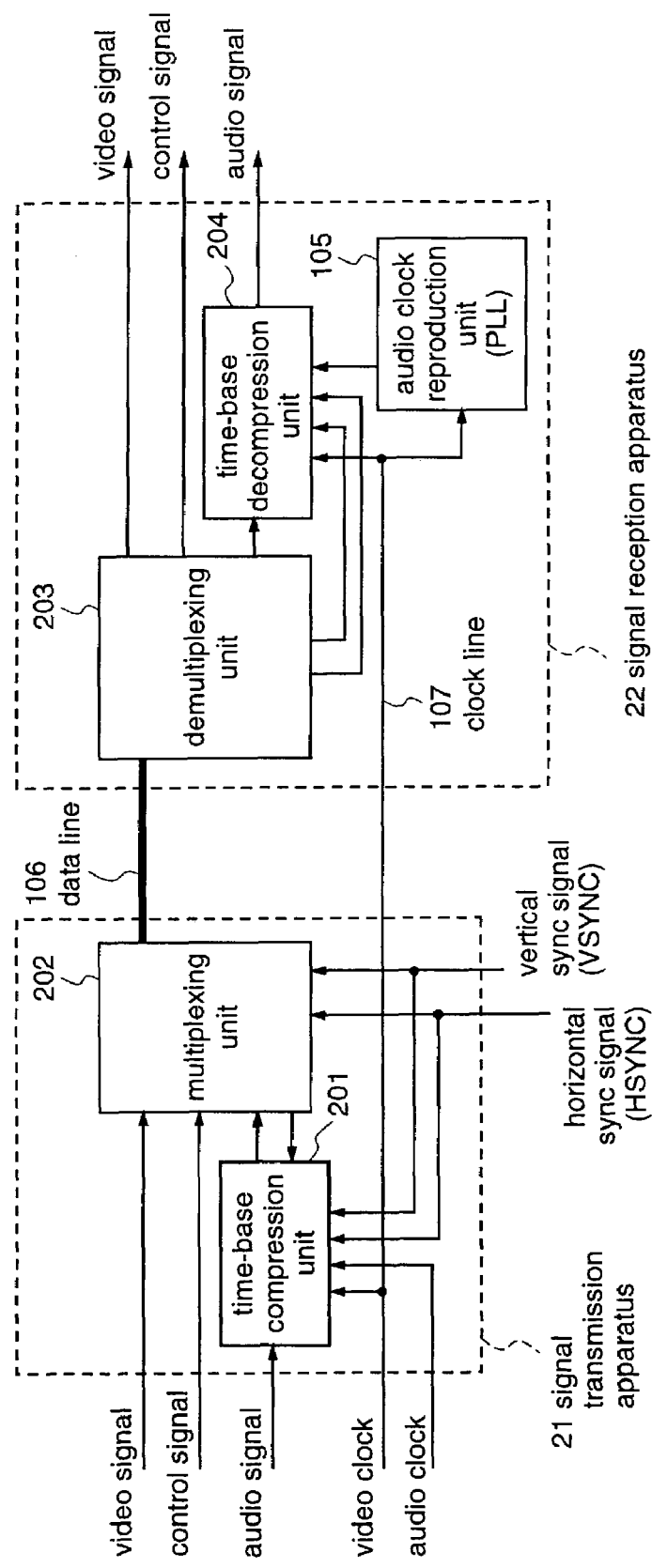
FIG. 12 is a block diagram illustrating a signal transmission system according to a second embodiment of the present invention.

FIG. 12 is a block diagram illustrating the construction of the signal transmission system according to the second embodiment.

With reference to FIG. 12, the signal transmission system according to the second embodiment is provided with a signal transmission apparatus 21 and a signal reception apparatus 22. The signal transmission apparatus 21 is provided with a time-base compression unit 201 for compressing an audio signal on the time axis, and a multiplexing unit 202 for time-division-multiplexing a video signal, a control signal, and the time-base-compressed audio signal, and outputting the multiplexed signal to a data line 106. The signal reception apparatus 22 is provided with a demultiplexing unit 203 for demultiplexing the multiplexed video-audio-control signal wherein the video signal, the audio signal, and the control signal are multiplexed, which is transmitted through the data line 106, into the respective signals; a time-base decompression unit 204 for performing time-base decompression on the audio signal separated by the demultiplexing unit 203 to restore the original audio signal; and an audio clock reproduction unit 105. Since the audio clock reproduction unit 105 is identical to that described for the first embodiment, repeated description is not necessary.

Figure 15:
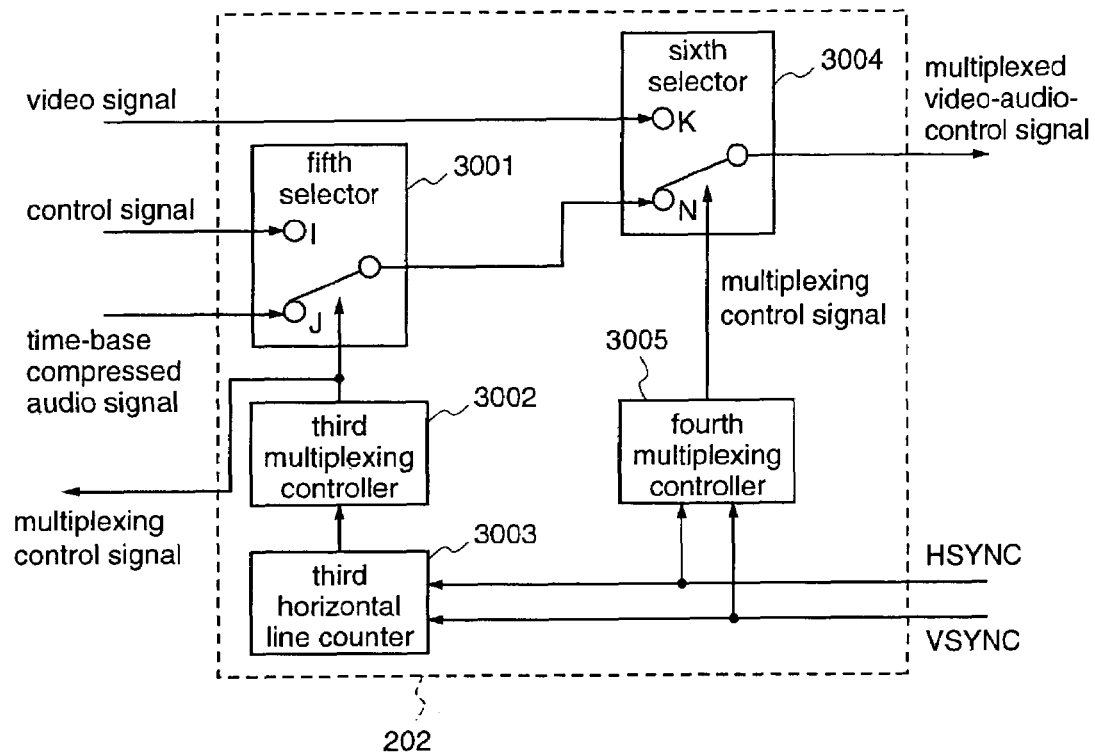
FIG. 15 is a block diagram illustrating a multiplexing unit according to the second embodiment.

FIG. 15 is a block diagram illustrating the multiplexing unit 202.

With reference to FIG. 15, the multiplexing unit 202 is provided with a fifth selector 3001 for selecting either the control signal or the time-base-compressed audio signal; a third multiplexing controller 3002 for controlling the fifth selector 3001; a third horizontal line counter 3003 for counting the number of horizontal lines, in a like manner as the first horizontal line counter 1003 according to the first embodiment; a sixth selector 3004 for selecting either the video signal or the output of the fifth selector 3001; and a fourth multiplexing controller 3005 for controlling the sixth selector.

Figure 17:
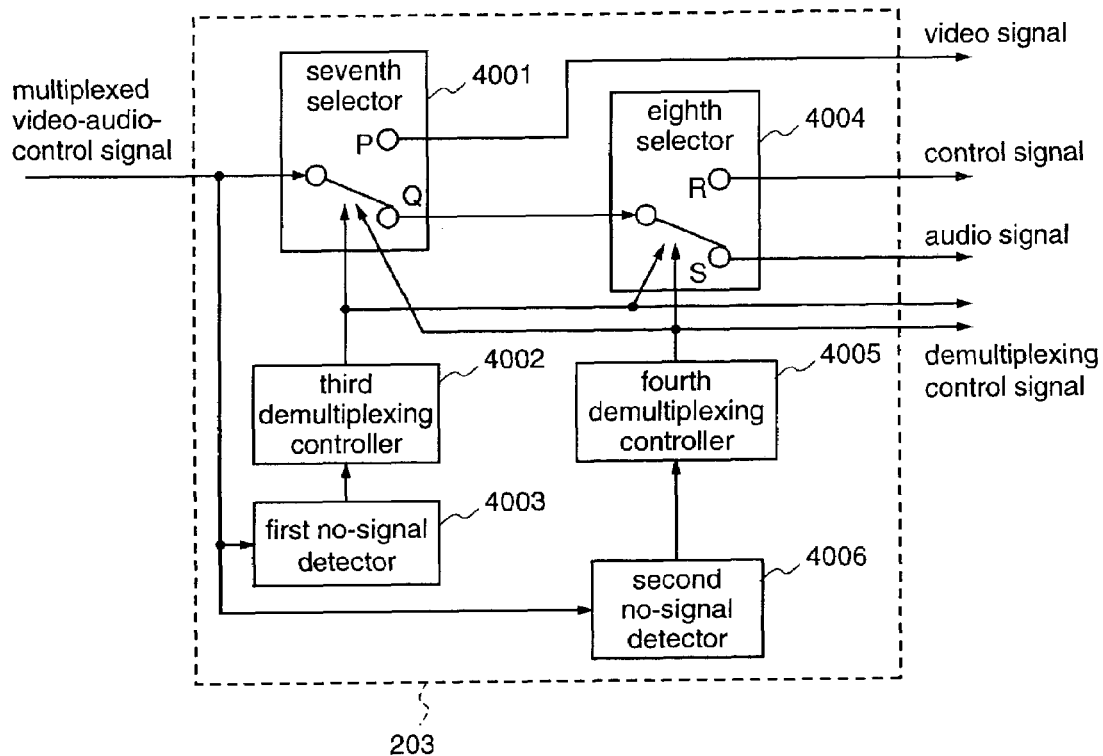
FIG. 17 is a block diagram illustrating a demultiplexing unit according to the second embodiment.

FIG. 17 is a block diagram illustrating the demultiplexing unit 203.

With reference to FIG. 17, the demultiplexing unit 203 is provided with a seventh selector 4001 for dividing the multiplexed video-audio-control signal into the video signal and the other signals; a third demultiplexing controller 4002 for controlling the seventh selector 4001 and an eighth selector 4004; a first no-signal detector 4003 for detecting a no-signal period (L1 cycles of the video clock); an eighth selector 4004 for dividing the signal in which the audio signal and the control signal are multiplexed, into the respective signals; a fourth demultiplexing controller 4005 for controlling the seventh selector 4001 and the eighth selector 4004; and a second no-signal detector 4006 for detecting a no-signal period (L2 cycles of the video clock).

Next, a description will be given of the operations of the signal transmission system, the signal transmission apparatus, and the signal reception apparatus according to the second embodiment.

Initially, the operation of the signal transmission apparatus 21 will be described.

Figure 13:
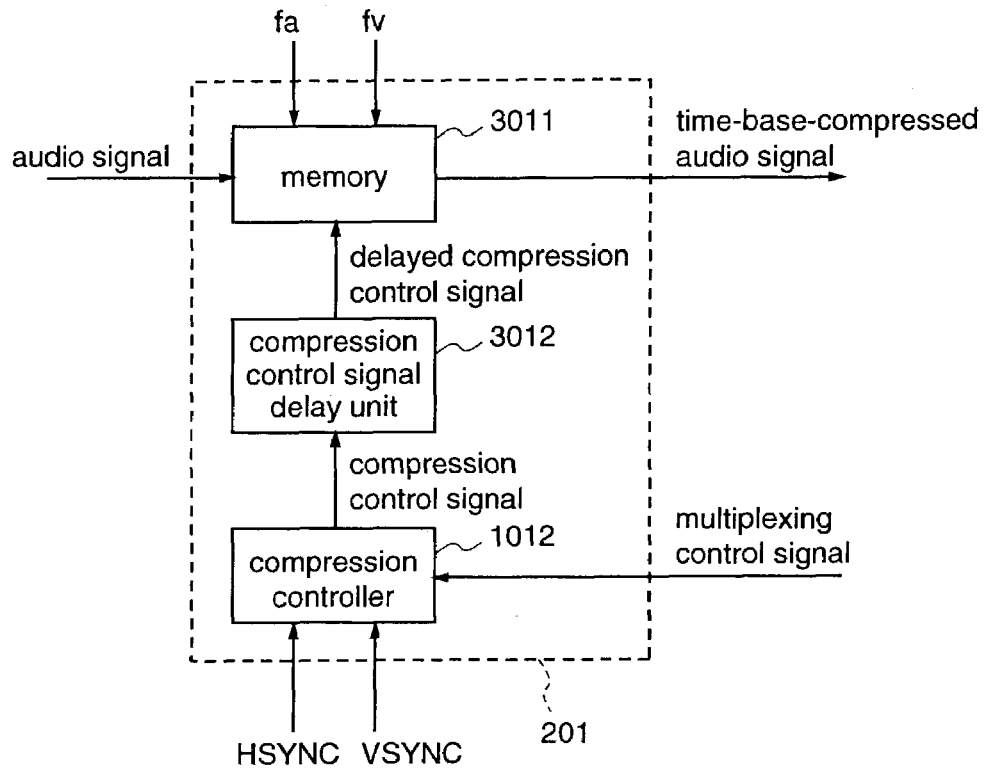
FIG. 13 is a block diagram illustrating a time-base compression unit according to the second embodiment.

FIG. 13 is a block diagram illustrating the time-base compression unit 201.

The time-base compression unit 201 shown in FIG. 13 comprises a memory 3011, a compression control signal delay unit 3012, and a compression controller 1012, and converts the rate of the inputted audio signal. The compression controller 1012 is identical to that of the first embodiment. The memory 3011 is identical to the memory 1011 of the first embodiment except that it performs output control according to a delayed compression control signal supplied from the compression control signal delay unit 3012, instead of a compression control signal supplied from the compression controller 1012. The compression control signal delay unit 3012 outputs, to the memory 3011, a delayed compression control signal which falls when a period (L1×1/fv sec) equivalent to L1 cycles of the video clock (frequency: fv) has passed from falling of a compression control signal supplied from the compression controller 1012, and rises when a period (M1×1/fv sec) equivalent to M1 cycles of the video clock has passed from the falling. The reason why the delayed compression control signal is used for output control of the memory 3011 is as follows. A non-signal period (L1 cycles of the video clock) is provided before the time-base-compressed audio signal, and the signal reception apparatus 22 detects this non-signal period to recognize the timing of switching the video signal and the audio signal.

Figure 14:
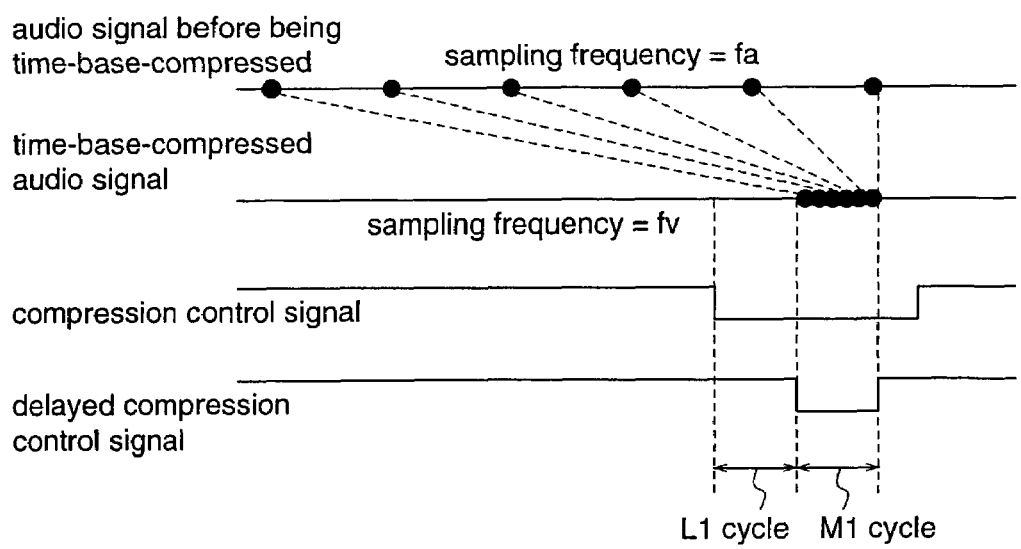
FIG. 14 is a diagram illustrating time-base compression according to the second embodiment.

FIG. 14 is a diagram illustrating time-base compression.

In FIG. 14, the audio signal which is not yet subjected to time-base compression is inputted to the memory 3011 at a sampling frequency fa, and the time-base-compressed audio signal is outputted from the memory 3011 at a sampling frequency fv. The time-base-compressed audio signal is outputted in a period during which the delayed compression control signal from the compression control signal delay unit 3012 is LOW (a period of M1 cycles). Accordingly, as shown in FIG. 14, the audio signal is outputted from the memory 3011 in the period of M1 cycles, after the no-signal period which corresponds to the period of L1 cycles from the falling of the compressed control signal (L1×1/fv sec).

Next, a description will be specifically given of the operation of the multiplexing unit 202 which multiplexes the video signal, the control signal, and the time-base-compressed audio signal, and outputs a multiplexed video-audio-control signal, with reference to FIG. 15.

Although this second embodiment is identical to the first embodiment in that the control signal and the time-base-compressed audio signal are multiplexed in a period during which no video signal exists (i.e., the vertical blanking period corresponding to the 1st to 45th lines on the screen and the horizontal blanking period corresponding to the 46th and subsequent lines), this second embodiment is different from the first embodiment in that a predetermined no-signal period is provided before each of the control signal and the time-base-compressed audio signal which are to be multiplexed.

The third horizontal line counter 3003 is identical to the first horizontal line counter 1003 according to the first embodiment, and it counts the number of horizontal lines on the screen. The third multiplexing controller 3002 outputs, for a period equal to M2 cycles of the video clock, "0" as a multiplexing control signal when a period equal to L2 cycles of the video clock (L2×1/fv sec) has passed from when the output of the third horizontal line counter 3003 became 1. In the cases other than mentioned above, for example, when the output of the third horizontal line counter 3003 is 2 or more, the third multiplexing controller 3002 outputs "1" as a multiplexing control signal. The fifth selector 3001 selects the control signal side (I) when the multiplexing control signal received from the third multiplexing controller 3002 is "0", and selects the audio signal side (J) when the multiplexing control signal is "1". In this way, the control signal side (I) is selected in the period equal to M2 cycles of the video clock from when the period equal to L2 cycles of the video clock has passed, in the 1st line on the screen. In the period other than mentioned above, the audio signal side (J) is selected. However, even when the fifth selector 3001 selects the audio signal side (J), a no-signal period corresponding to L1 cycles of the video clock (L1×1/fv sec) exists before the time-base-compressed audio signal, as shown in FIG. 14. The control signal to be inputted to the fifth selector 3001 is inputted only when the fifth selector 3001 selects the control signal side (I). Accordingly, a no-signal period corresponding to L2 cycles of the video clock exists before the control signal. Further, the multiplexing control signal from the third multiplexing controller 3002 is also outputted to the time-base compression unit 201.

The fourth multiplexing controller 3005 is identical to the second multiplexing controller 1005 of the first embodiment, and it controls the sixth selector 3004 so that the sixth selector 3004 selects the selected output side (N) of the fifth selector 3001 in the blanking period, and selects the video signal side (K) in the non-blanking period. In this way, a multiplexed video-audio-control signal, in which the video signal, the control signal, and the time-base-compressed audio signal are multiplexed, can be obtained.

Figure 16:
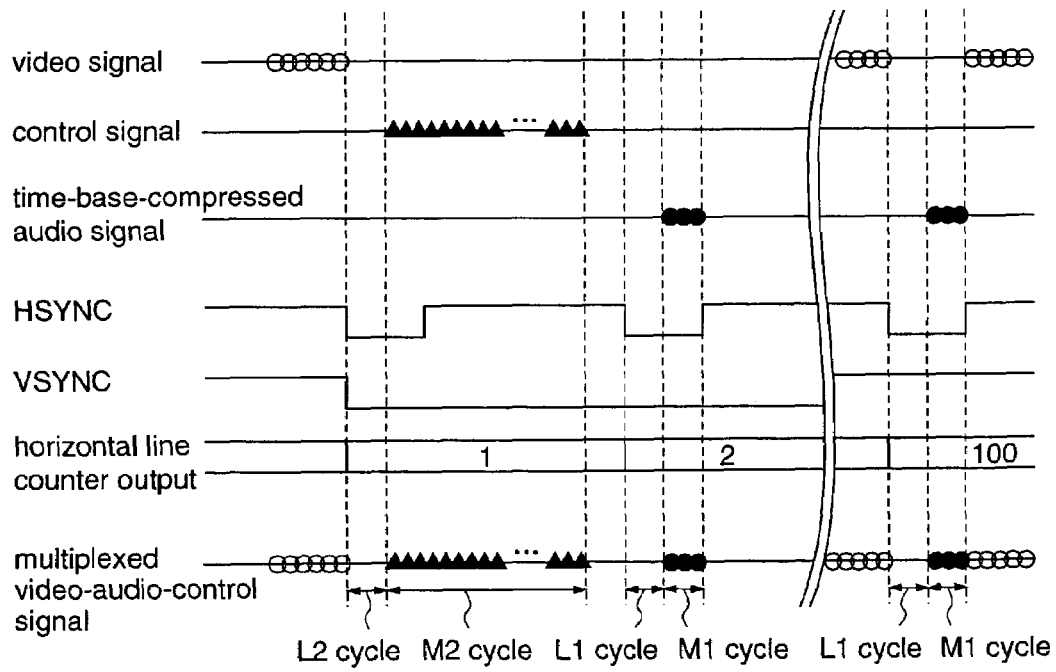
FIG. 16 is a diagram illustrating multiplexing of a video signal, an audio signal, and a control signal, according to the second embodiment.

FIG. 16 is a diagram illustrating multiplexing of the video signal, the audio signal, and the control signal, according to the second embodiment. FIG. 16 is identical to FIG. 7 according to the first embodiment except that a predetermined no-signal period exists before each of the audio signal and the control signal.

Next, the operation of the signal reception apparatus 22 will be described.

Initially, a description will be specifically given of the operation of the demultiplexing unit 203 for demultiplexing the multiplexed video-audio-control signal in which the video signal, the control signal, and the time-base-compressed audio signal are multiplexed, into the respective signals to output, with reference to FIG. 17.

As described above, in the blanking period of the video signal, the time-base-compressed audio signal is superimposed after the no-signal period corresponding to L1 cycles of the video clock, and the control signal is superimposed after the no-signal period corresponding to L2 cycles of the video clock.

The first no-signal detector 4003 detects the no-signal period corresponding to L1 cycles of the video clock from the multiplexed video-audio-control signal which is transmitted from the signal transmission apparatus 21, and notifies the third demultiplexing controller 4002 that it has detected the no-signal period. Then, the third demultiplexing controller 4002 judges that the audio signal is superimposed on a period other than the vertical blanking period, and controls the seventh selector 4001 so that it selects the eighth selector 4004 side (Q), and controls the eighth selector 4004 so that it selects the audio signal output side (S), thereby making the eighth selector 4004 output the audio signal equivalent to M1 samples. Thereafter, the third demultiplexing controller 4002 controls the seventh selector 4001 so that it selects the video signal output side (P).

Further, the second no-signal detector 4006 detects the no-signal period corresponding to L2 cycles of the video clock from the multiplexed video-audio-control signal, and notifies the fourth demultiplexing controller 4005 that it has detected the no-signal period. Then, the fourth demultiplexing controller 4005 judges that the control signal is superimposed on the vertical blanking period, and controls the seventh selector 4001 so that it selects the eighth selector 4004 side (Q), and controls the eighth selector 4004 so that it selects the control signal output side (R), thereby making the eighth selector 4004 output the control signal equivalent to M2 samples. Thereafter, the fourth demultiplexing controller 4005 controls the seventh selector 4001 so that it selects the video signal output side (P). Further, the fourth demultiplexing controller 4005 judges that the audio signal corresponding to the period of M1 cycles is superimposed on the vertical blanking period from when a period equivalent to one horizontal line and L1 cycles has passed from the start of the no-signal period of L2 cycles (which is calculated from the output from the second no-signal detector 4006), and controls the seventh selector 4001 so that it selects the eighth selector 4004 side (Q), and controls the eighth selector 4004 so that it selects the audio signal output side (S), thereby making the eighth selector 4004 output the control signal equivalent to M1 samples. Thereafter, the fourth demultiplexing controller 4005 controls the seventh selector 4001 so that it selects the video signal output side (P). The demultiplexing control signals from the third and fourth demultiplexing controllers 4002 and 4005 are also outputted to the time-base decompression unit 204.

Figure 18:
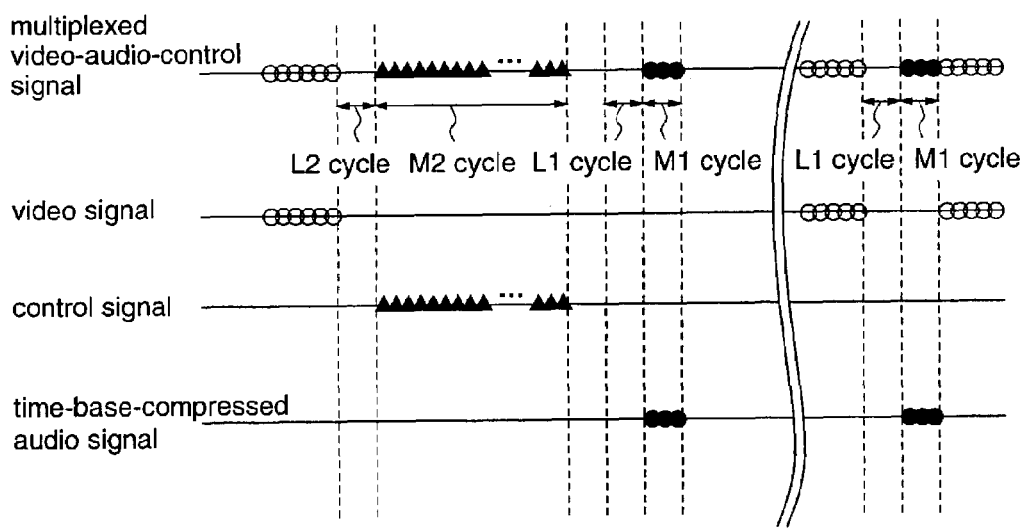
FIG. 18 is a diagram illustrating demultiplexing of a video signal, an audio signal, and a control signal, according to the second embodiment.

FIG. 18 is a diagram illustrating demultiplexing of the video signal, the audio signal, and the control signal according to the second embodiment. FIG. 18 is identical to FIG. 9 according to the first embodiment except that a predetermined no-signal state exists before each of the audio signal and the control signal.

Next, the time-base decompression unit 204 will be described.

Figure 19:
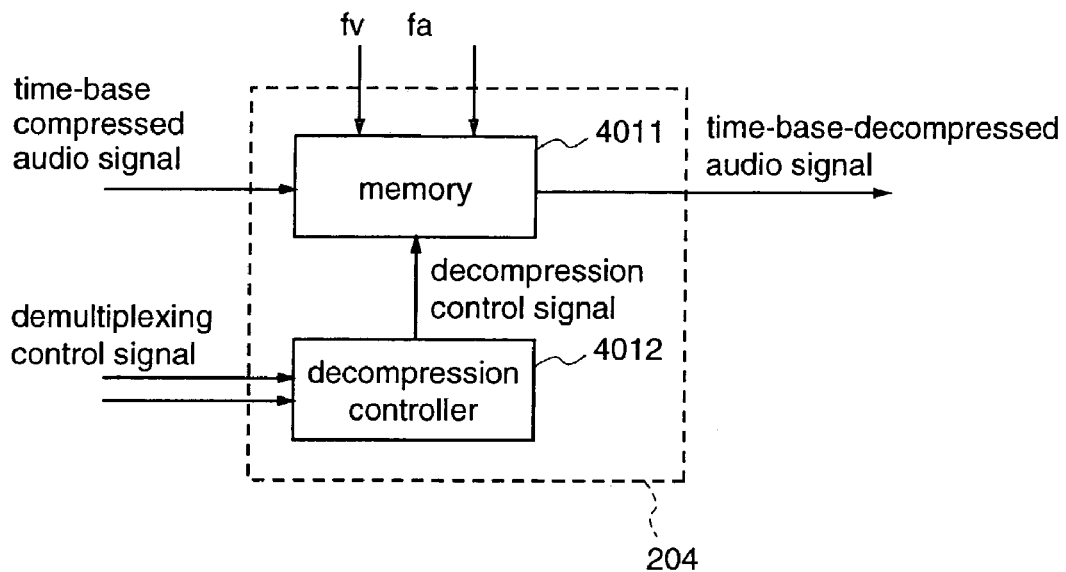
FIG. 19 is a block diagram illustrating a time-base decompression unit according to the second embodiment.

FIG. 19 is a block diagram illustrating the time-base decompression unit 204.

The time-base decompression unit 204 shown in FIG. 19 is provided with a memory 4011 and a decompression controller 4012, like the time-base decompression unit 104 of the first embodiment. To be specific, an input clock of the time-base-compressed audio signal to be inputted to the memory 4011 is a video clock (frequency: fv) while an output clock from the memory 4011 is an audio clock (frequency: fa), and a decompression control signal outputted from the decompression controller 4012 is used for input control of the memory 4011. This decompression control signal is generated as follows, by using the two demultiplexing control signals supplied from the demultiplexing unit 203.

In a period during which control is carried out so as to select the audio signal output side (S) of the eighth selector 4004 according to the demultiplexing control signals from the third and fourth demultiplexing controllers 4002 and 4005, since the audio signal is being outputted from the demultiplexing unit 203, the decompression controller 4012 generates a decompression control signal which becomes LOW during this period. However, this decompression control signal is negative logic.

Figure 20:
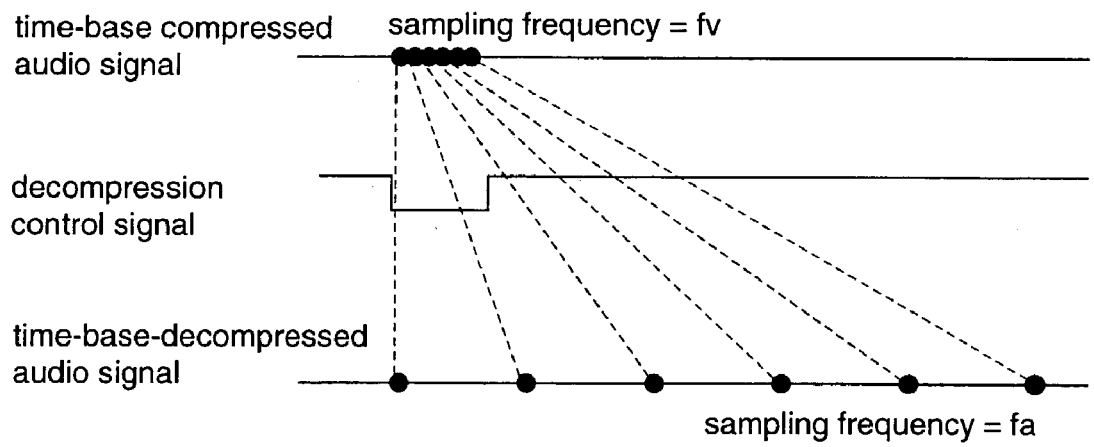
FIG. 20 is a diagram illustrating time-base decompression according to the second embodiment.

FIG. 20 is a diagram illustrating time-base decompression.

In FIG. 20, the time-base-compressed audio signal is inputted to the memory 4011 at the sampling frequency fv in a period during which the decompression control signal is LOW, and the audio signal after time-base decompression is outputted from the memory 4011 at the sampling frequency fa. In this way, the time-base-decompressed audio signal is obtained.

As described above, in the signal transmission system, the signal transmission apparatus, and the signal reception apparatus according to the second embodiment, when the multiplexing unit 202 multiplexes the control signal and the time-base-compressed audio signal, a predetermined no-signal period is provided before each of these signals. The no-signal periods are detected when the demultiplexing unit 203 demultiplexes the multiplexed signal, whereby a period in which the control signal and the audio signal are multiplexed can be specified to separate these signals from each other. Accordingly, the same effects as those achieved by the first embodiment can be obtained without transmitting the horizontal sync signal and the vertical sync signal from the signal transmission apparatus 21 to the signal reception apparatus 22.

The multiplexing unit 202 according to the second embodiment multiplexes the audio signal only in the period of M1 cycles after the no-signal period of L1 cycles in the vertical blanking period. However, in order to multiplex more audio signals in the vertical blanking period, the multiplexing unit 202 may multiplex the audio signal also in the vertical blanking period corresponding to the 2nd to 45th horizontal lines. In this case, the demultiplexing unit 203 in the signal reception apparatus 22 must be constructed so as to demultiplex the audio signal adaptively to the multiplexing.

Embodiment 3

Hereinafter, a signal transmission system, a signal transmission apparatus, and a signal reception apparatus according to a third embodiment of the present invention will be described with reference to the drawings.

According to this third embodiment, the signal transmission system according to the first embodiment is applied to the DVI (Digital Visual Interface) standard.

Figure 21:
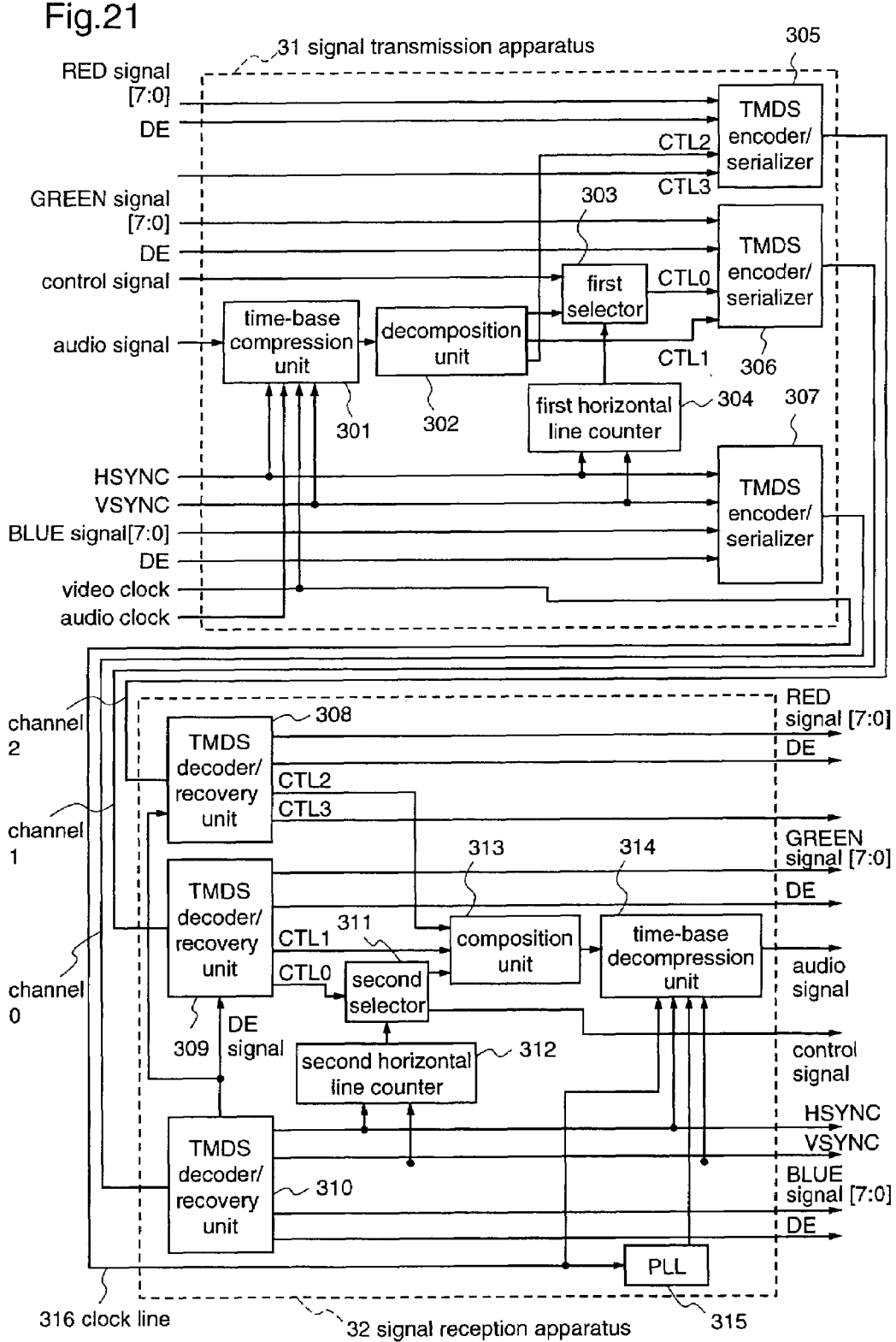
FIG. 21 is a block diagram illustrating a signal transmission system according to a third embodiment of the present invention.

FIG. 21 is a block diagram illustrating a signal transmission system according to the third embodiment.

In FIG. 21, the signal transmission system according to the third embodiment is provided with a signal transmission apparatus 31 and a signal reception apparatus 32.

The signal transmission apparatus 31 is provided with a time-base compression unit 301 which is identical to the time-base compression unit 101 according to the first embodiment; a decomposition unit 302 for decomposing a time-base-compressed audio signal into lines CTL0, CTL1, and CTL2 based on the DVI standard; a first selector 303 for selectively outputting a control signal and a time-base-compressed audio signal; a first horizontal line counter 304 for counting the number of horizontal lines on a screen; and TMDS encoders/serializers 305-307. The signal reception apparatus 32 is provided with TMDS decoders/recovery units 308-310; a second selector 311 for separating the control signal from the audio signal; a second horizontal line counter 312 for counting the number of horizontal lines on the screen; a composition unit 313 for composing the audio signals transmitted through the lines CTL0, CTL1, and CTL2; a time-base decompression unit 314 for decompressing the time-base-compressed audio signal outputted from the composition unit 313; and a PLL 315. The time-base compression unit 301, the time-base decompression unit 314, the first horizontal line counter 304, and the second horizontal line counter 312 are identical to the time-base compression unit 101, the time-base decomposition unit 104, the first horizontal line counter 1003, and the second horizontal line counter 2005 according to the first embodiment, respectively. Further, the PLL 315 is identical to the audio clock reproduction unit 105 according to the first embodiment, and the PLL 315 reproduces the audio clock on the basis of the video clock which is transmitted through the clock line 316. Further, the TMDS encoders/serializers 305~307 and the TMDS decoders/recovery units 308~310 are identical to those of the conventional signal transmission system. The decomposition unit 302, the first selector 303, the first horizontal line counter 304, and the TMDS encoders/serializers 305~307 according to the third embodiment correspond to the multiplexing unit 102 according to the first embodiment. Further, the TMDS decoders/recovery units 308~310, the second selector 311, the second horizontal line counter 312, the composition unit 313, and the PLL 315 according to the third embodiment correspond to the demultiplexing unit 103 according to the first embodiment.

With reference to FIG. 21, a signal in which a BLUE signal, a horizontal sync signal (HSYNC), and a vertical sync signal (VSYNC) of a video signal are time-division-multiplexed is serially transmitted through a channel 0 of a transmission path. Further, a signal in which a GREEN signal, audio signals (CTL0,CTL1), and a control signal (CTL0) are time-division-multiplexed is serially transmitted through a channel 1. Furthermore, a signal in which a RED signal and an audio signal (CTL2) are time-division-multiplexed is serially transmitted through a channel 2. In this third embodiment, not only the audio signal but also the control signal are multiplexed in the line CTL0.

Next, a description will be given of the operations of the signal transmission system, the signal transmission apparatus, and the signal reception apparatus according to the third embodiment.

Initially, the operation of the signal transmission apparatus 31 will be described.

The audio signal inputted to the signal transmission apparatus 31 is subjected to time-base compression by the time-base compression unit 301, and outputted to the decomposition unit 302. The decomposition unit 302 decomposes the time-base-compressed audio signal into three lines CTL0, CTL1, and CTL2 so that the order of CTL0, CTL1, CTL2, CTL0, CTL1, CTL2, . . . is repeated according to the order of the sampling points. This decomposition of the audio signal into the three lines may be carried out for every sampling point, or it may be carried out for every unit of several sampling points. Further, depending on whether the transmission rate of the audio signal is high or low, only one line CTL0 or two lines CTL1 and CTL2 may be used.

The first selector 303 selects the control signal in the 1st horizontal line, and selects the audio signal from the decomposition unit 302 in the 2nd and subsequent horizontal lines, according to the count from the first horizontal line counter 304, and outputs the selected signal to the line CTL0. Thereby, the control signal and the audio signal can be multiplexed in the CTL0.

Since the control signal is superimposed on the 1st line of the CTL0, the 1st lines of the CTL1 and CTL2 may be set at "Reserved" so as to time the control signal to the audio signal which is also superimposed on the CTL0.

Each of the TMDS encoders/serializers 305~307 subjects the inputted signals to TMDS encoding, serializes the encoded signals, and outputs the serialized signal to the transmission path.

Figure 22:
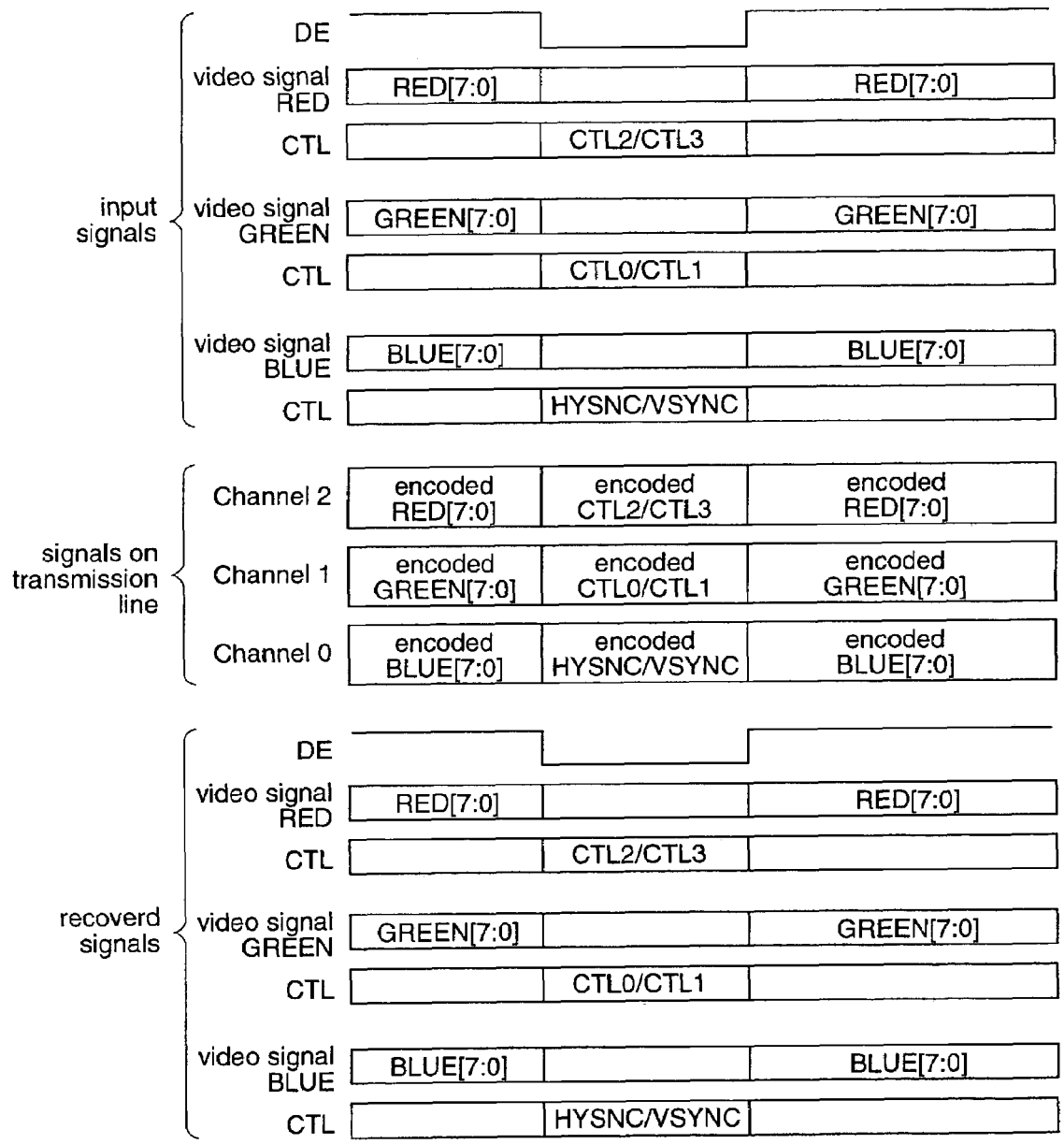
FIG. 22 is a diagram illustrating the states of signals on a transmission path according to the third embodiment.

FIG. 22 is a diagram illustrating the states of the signals on the transmission path according to the third embodiment.

The upper section of FIG. 22 shows the signals to be inputted to the TMDS encoders. The CLT signal is inserted while the DE (Date Enable) signal is LOW, and the control signal and the time-base-compressed audio signal are superimposed on the CTL0, and the time-base-compressed audio signal is superimposed on the CTL1 and CTL2, followed by TMDS encoding.

The middle section of FIG. 22 shows the signals on the transmission path. The encoded CTL2 and CTL3 are superimposed on the channel 2, and the encoded CTL0 and CTL1 are superimposed on the channel 1. In the DVI standard, the CTL signal is to be superimposed on the blanking period of the video signal. Therefore, on the transmission path, the audio signal is superimposed on the horizontal blanking period, and the audio signal and the control signal are superimposed on the vertical blanking period.

The lower section of FIG. 22 shows the signals which have been TMDS-decoded and recovered in the signal reception apparatus 32. The recovered signal is identical to the input signal to the signal transmission apparatus 31.

Next, the operation of the signal reception apparatus 32 will be described.

Figure 23:
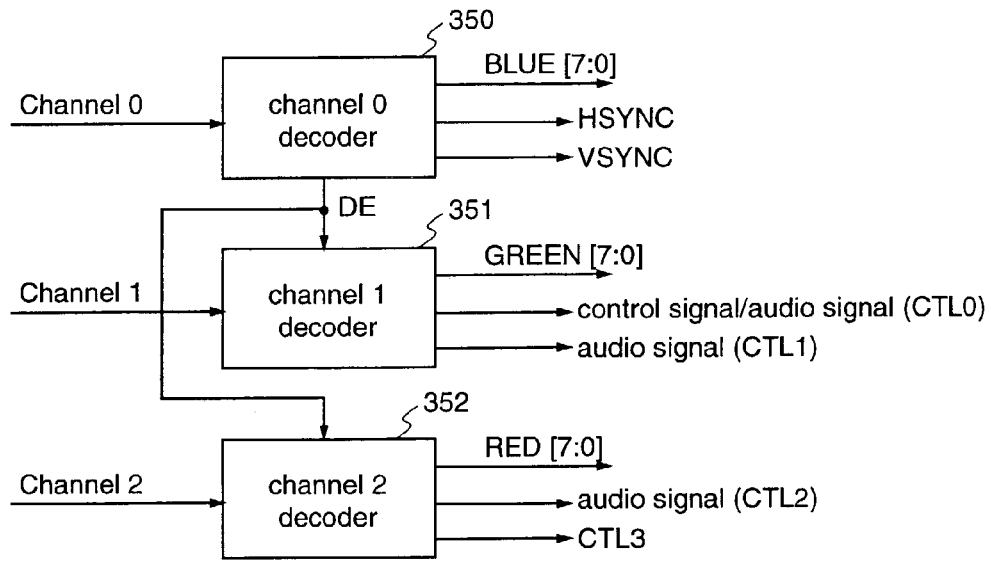
FIG. 23 is a diagram illustrating a method for demultiplexing a video signal, an audio signal, and a control signal, according to the third embodiment.

FIG. 23 is a diagram illustrating a method of demultiplexing the video signal, the audio signal, and the control signal by the signal reception apparatus 32.

As shown in FIG. 23, initially, a channel 0 decoder 350 decodes a signal on channel 0 to generate a BLUE signal, a DE signal, a horizontal sync signal (HSYNC), and a vertical sync signal (VSYNC). Then, the DE signal is supplied to a channel 1 decoder 351 and to a channel 2 decoder 352. The channel 1 decoder 351 and the channel 2 decoder 352 judge that a period during which the received DE signal is LOW is a period where the audio signal and the control signal are multiplexed, and separate the audio signal and the control signal from the video signal. In this way, the multiplexed audio and control signal in the CTL0, the audio signal in the CTL1, and the audio signal in the CTL2 are separated from each other.

Figure 24:
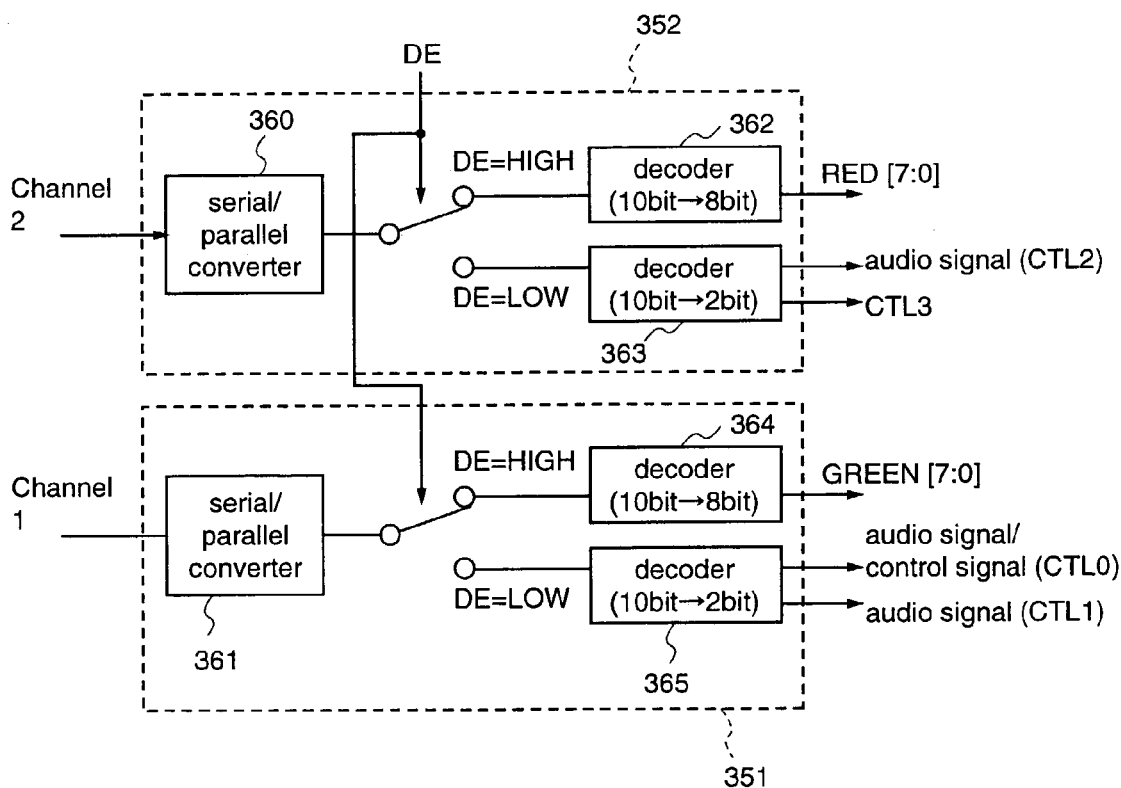
FIG. 24 is a diagram illustrating a method for decoding a video signal, an audio signal, and a control signal, according to the third embodiment.
Figure 25:
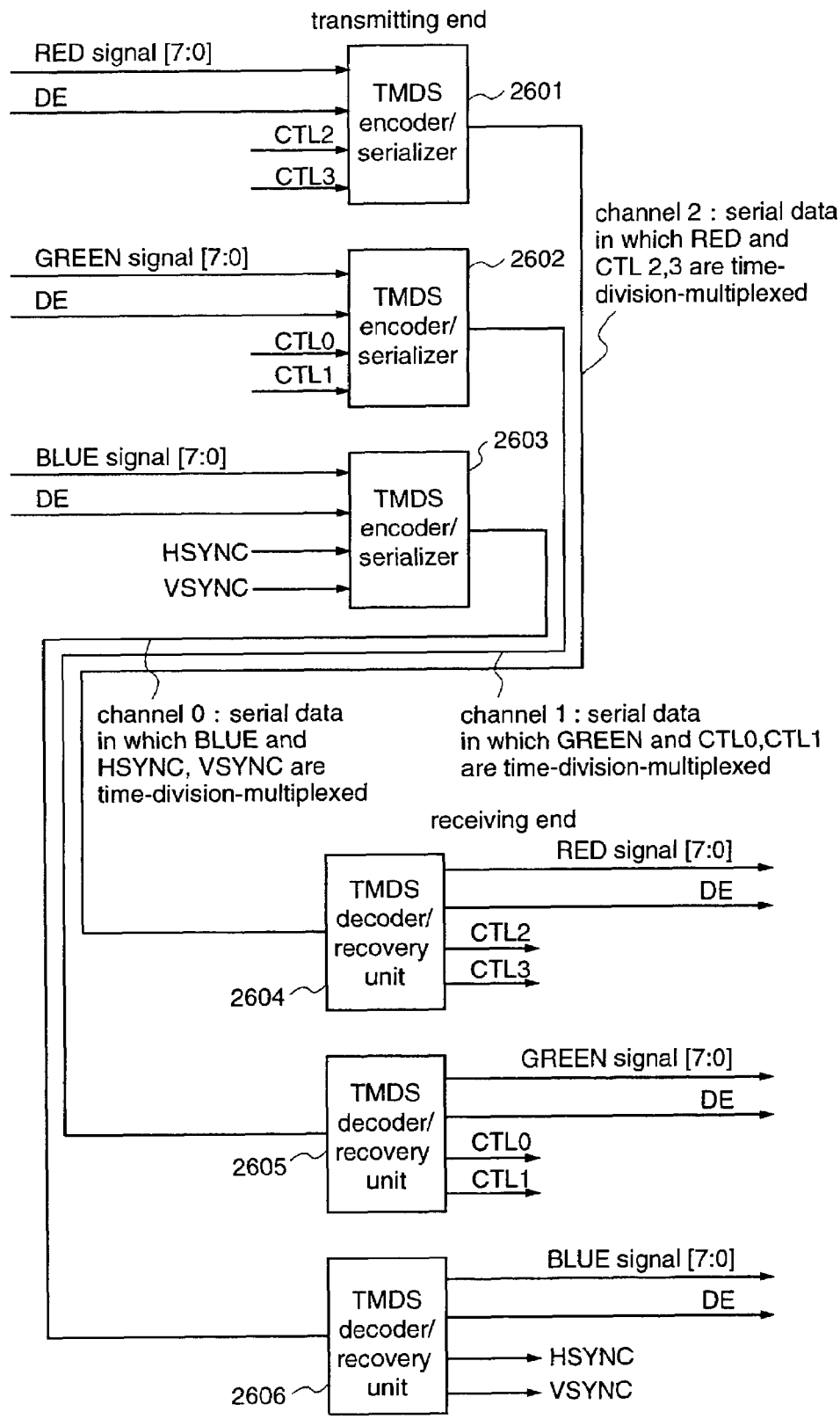
FIG. 25 is a block diagram illustrating a conventional signal transmission system.

FIG. 24 is a diagram illustrating a method of decoding the video signal, the audio signal, and the control signal by the channel 2 decoder 352 and the channel 1 decoder 351.

As shown in FIG. 24, a serial/parallel converter 360 performs serial/parallel conversion on the multiplexed video-audio signal which is transmitted through the channel 2. While the DE signal is HIGH, it is judged that the signal on the channel 2 is a video signal, and a decoder 362 performs 10-bits/8-bits TMDS decoding on the converted video signal supplied from the serial/parallel converter 360, thereby outputting the RED signal. On the other hand, while the DE signal is low, it is judged that the signal on the channel 2 is an audio signal, and a decoder 363 performs 10-bits/2-bits TMDS decoding on the converted audio signal, thereby outputting the audio signal to the line CTL2.

Likewise, the multiplexed video-audio-control signal which is transmitted through the channel 1 is also subjected to serial/parallel conversion by a serial/parallel converter 361. While the DE signal is HIGH, it is judged that the signal on the channel 1 is an audio signal, and a decoder 364 performs 10-bits/8-bits TMDS decoding on the converted video signal, thereby outputting the GREEN signal. On the other hand, while the DE signal is LOW, it is judged that the signal on the channel 1 is a signal other than the video signal, a decoder 365 performs 10-bits/2-bits TMDS decoding on the converted signal, thereby outputting the signal in which the control signal and the audio signal are multiplexed, to the line CTL0, and outputs the audio signal to the line CTL1.

Next, a description will be given of a method of demultiplexing the control signal and the audio signal which are multiplexed on the CTL0.

The second selector 311 judges that the signal on the line CTL0 is a control signal when the output of the second horizontal line counter 312 is the 1st line, and separates the control signal from the CTL0 and outputs the control signal. On the other hand, when the output of the second horizontal line counter 312 is any of the 2nd and subsequent lines, the second selector 311 judges that the signal on the line CTL0 is an audio signal, and separates the audio signal from the CTL0 and outputs it to the composition unit 313.

The composition unit 313 determines that the decoded audio signals transmitted through the transmission path are in the order of CTL0, CTL1, CTL2, and performs composition of the audio signals. Although the order of the audio signals is not restricted to that mentioned above, it must be predetermined by the signal transmission apparatus 31 and the signal reception apparatus 32.

The composite audio signal obtained by the composition unit 131 is subjected to rate conversion by the time-base decompression unit 314, and restored to the original audio signal.

As described above, in the signal transmission system, the signal transmission apparatus, and the signal reception apparatus according to the third embodiment, the construction of the signal transmission system according to the first embodiment is applied to the DVI transmission standard for serially transmitting R, G, B video signals. The decomposition unit 302 decomposes the time-base-compressed audio signal into the three lines CTL0, CTL1, and CTL2, and the first selector 303 multiplexes the control signal and the audio signal, and the TMDS encoders/serializers 305~307 multiplex the decomposed audio signals corresponding to the respective channels for R, G, B and the signal in which the control signal and the audio signal are multiplexed. Further, the TMDS decoders/recovery units 308~310 demultiplex the multiplexed signals into the decomposed audio signals corresponding to the respective channels for R, G, B and the control signal, and the composition unit 313 composes the decomposed audio signals, whereby the multiplexed signal can be demultiplexed into the video signal, the control signal, and the audio signal at the receiving end. Thus, transmission of the control signal and the audio signal using the transmission line for the video signal is realized in the signal transmission system based on the DVI standard by which only the video signal has conventionally been transmitted.

While in this third embodiment the control signal is superimposed on the CTL0, the control signal may be superimposed on a line of another CTL signal, such as DVI-based CTL1, CTL2, CTL4, CTL5, or the like by a method similar to that mentioned above, or the control signal may be superimposed on plural lines of CTL signals selected from those mentioned above.

Further, while in the first to third embodiments the control signal is superimposed on the line CTL0 in the 1st line on the screen, the control signal may be superimposed on any line as long as the line is in the vertical blanking period, or the control signal may be superimposed on plural lines on the screen.

As described above, a signal transmission system, a signal transmission apparatus, and a signal reception apparatus according to the present invention are suited for a signal transmission system, a signal transmission apparatus, and a signal reception apparatus, which multiplex a video signal, an audio signal, and a control signal to transmit or transmit and receive a multiplexed signal.

The invention claimed is:

1. A signal transmission system comprising:
    a signal transmission apparatus for transmitting a signal; and
    a signal reception apparatus for receiving the signal transmitted from said signal transmission apparatus through a transmission path, wherein
    said signal transmission apparatus is operable to time-base-compress an audio signal, time-division-multiplex a video signal, a control signal and the time-base-compressed audio signal into a multiplexed signal, and transmit the multiplexed signal to said signal reception apparatus through the transmission path,
    the control signal is used for controlling a characteristic of the video signal or audio signal outputted by said signal reception apparatus or a device connected to said signal reception apparatus, and
    said signal reception apparatus is operable to demultiplex the multiplexed signal transmitted from said signal transmission apparatus into the video signal, the control signal, and the time-base-compressed audio signal, and decompress the time-base-compressed audio signal.

2. A signal transmission system as defined in claim 1, wherein said signal transmission apparatus is operable to multiplex the control signal and the time-base-compressed audio signal in a blanking period of the video signal.

3. A signal transmission system as defined in claim 2, wherein said signal transmission apparatus is operable to multiplex the control signal in a predetermined portion of the blanking period, and multiplex the time-base-compressed audio signal in another portion of the blanking period different from the predetermined portion.

4. A signal transmission system as defined in claim 2, wherein said signal transmission apparatus is operable to transmit a vertical sync signal and a horizontal sync signal to said signal reception apparatus, and said signal reception apparatus is operable to receive the vertical sync signal and the horizontal sync signal, and perform demultiplexing of the multiplexed signal using the vertical sync signal and the horizontal sync signal.

5. A signal transmission system as defined in claim 2, wherein said signal transmission apparatus is operable to provide, in the multiplexed signal, a predetermined no-signal period before each of the control signal and the time-base-compressed audio signal, and said signal reception apparatus is operable to identify periods in which the control signal and the time-base-compressed audio signal are multiplexed by detecting the no-signal periods, and demultiplex the control signal and the time-base-compressed audio signal.

6. A signal transmission system as defined claim 1, wherein:

said signal transmission system is operable to employ the DVI transmission standard for serially transmitting video signals of red, green and blue;

said signal transmission apparatus is operable to multiplex the control signal and the time-base-compressed audio signal in a predetermined channel selected from among channels for red, green and blue; and said signal reception apparatus is operable to demultiplex the control signal and the time-base-compressed audio signal which are multiplexed in the predetermined channel.

7. A signal transmission system as defined in claim 6, wherein:

said signal transmission apparatus is operable to decompose the time-base-compressed audio signal into a plurality of audio signals, and multiplex the decomposed audio signals into a plurality of channels; and said signal reception apparatus is operable to demultiplex the decomposed audio signals, and compose the decomposed audio signals.

8. A signal transmission system in accordance with claim 1, wherein the characteristic of the video signal or audio signal outputted by said signal reception apparatus or a device connected to said signal reception apparatus is a brightness of the video signal or a volume of the audio signal.

9. A signal transmission apparatus for connecting to a signal reception apparatus through a transmission path, said signal transmission apparatus comprising:

a time-base compression means for time-base-compressing an audio signal; and a signal multiplexing means for time-division-multiplexing a video signal, a control signal and the time-base-compressed audio signal as a multiplexed signal, and for transmitting the multiplexed signal to the signal reception apparatus through the transmission path, wherein the control signal is used for controlling a characteristic of the video signal or audio signal outputted by a signal receiving end.

10. A signal transmission apparatus as defined in claim 9, wherein said signal multiplexing means multiplexes the control signal and the time-base-compressed audio signal in a blanking period of the video signal.

11. A signal transmission apparatus as defined in claim 10, wherein said signal multiplexing means multiplexes the control signal in a predetermined portion of the blanking period, and multiplexes the time-base-compressed audio signal in another portion of the blanking period different from the predetermined portion.

12. A signal transmission apparatus as defined in claim 10, wherein said signal multiplexing means transmits a vertical sync signal and a horizontal sync signal for detection of the blanking period, to the signal reception apparatus.

13. A signal transmission apparatus as defined in claim 10, wherein said signal multiplexing means provides a predetermined no-signal period, in the multiplexed signal, before each of the control signal and the time-base-compressed audio signal.

14. A signal transmission apparatus as defined in claim 9, wherein said signal multiplexing means employs the DVI transmission standard for serially transmitting video signals of red, green and blue, and multiplexes the control signal and the time-base-compressed audio signal into a predetermined channel selected from among channels for red, green and blue.

15. A signal transmission apparatus as defined in claim 14, wherein said signal multiplexing means decomposes the time-base-compressed audio signal into a plurality of audio signals, and multiplexes the decomposed audio signals into a plurality of channels.

16. A signal reception apparatus for connecting to a signal transmission apparatus through a transmission path, said signal reception apparatus comprising:

a signal demultiplexing means for demultiplexing a multiplexed signal in which a video signal, a control signal and a time-base-compressed audio signal are time-division-multiplexed, the multiplexed signal being transmitted from the signal transmission apparatus through the transmission path, into the video signal, the control signal, and the time-base-compressed audio signal, wherein the control signal is for controlling a characteristic of the video signal or audio signal outputted by said signal reception apparatus or a device connected to said signal reception apparatus; and a time-base decompression means for decompressing the time-base-compressed audio signal.

17. A signal reception apparatus as defined in claim 16, wherein said signal demultiplexing means demultiplexes the control signal and the time-base-compressed audio signal which are multiplexed in a blanking period of the video signal.

18. A signal reception apparatus as defined in claim 17, wherein said signal demultiplexing means demultiplexes the control signal which is multiplexed in a predetermined portion of the blanking period, and the time-base-compressed audio signal which is multiplexed in another portion of the blanking period except different from the predetermined portion.

19. A signal reception apparatus as defined in claim 17, wherein said signal demultiplexing means receives a vertical sync signal and a horizontal sync signal from the signal transmission apparatus, and performs demultiplexing of the video signal, the control signal, and the time-base-compressed audio signal, using the vertical sync signal and the horizontal sync signal.

20. A signal reception apparatus of claim 17, wherein said signal demultiplexing means detects a predetermined no-signal period which is provided, in the multiplexed signal before each of the control signal and the time-base-compressed audio signal, thereby to identify periods in which the control signal and the time-base-compressed audio signal are multiplexed, and demultiplexes the control signal and the time-base-compressed audio signal.

21. A signal reception apparatus as defined in claim 16, wherein said signal demultiplexing means employs the DVI transmission standard for serially transmitting video signals of red, green and blue, and demultiplexes the control signal and the time-base-compressed audio signal which are multiplexed into a predetermined channel selected from among channels for red, green and blue.

22. A signal reception apparatus as defined in claim 21, wherein:

the time-base-compressed audio signal is decomposed into a plurality of audio signals, and the decomposed audio signals are multiplexed into a plurality of channels; and said signal demultiplexing means demultiplexes the decomposed audio signals, and composes the decomposed audio signals.

* * * * *